United States Patent
Abu Salah et al.

(10) Patent No.: US 10,955,899 B2
(45) Date of Patent: Mar. 23, 2021

(54) SYSTEM, APPARATUS AND METHOD FOR RESPONSIVE AUTONOMOUS HARDWARE PERFORMANCE STATE CONTROL OF A PROCESSOR

(71) Applicant: Intel Corporation, Santa Clara, CA (US)

(72) Inventors: Hisham Abu Salah, Majdal Shams (IL); Efraim Rotem, Haifa (IL); Eliezer Weissmann, Haifa (IL); Yoni Aizik, Haifa (IL); Daniel D. Lederman, Karmiel (IL)

(73) Assignee: Intel Corporation, Santa Clara, CA (US)

( * ) Notice: Subject to any disclaimer, the term of this patent is extended or adjusted under 35 U.S.C. 154(b) by 272 days.

(21) Appl. No.: 16/013,142

(22) Filed: Jun. 20, 2018

(65) Prior Publication Data

US 2019/0041944 A1 Feb. 7, 2019

(51) Int. Cl.
| | | |
|---|---|---|
| G06F 1/32 | (2019.01) | |
| G06F 1/324 | (2019.01) | |
| G06F 1/3296 | (2019.01) | |
| G06F 1/3206 | (2019.01) | |

(52) U.S. Cl.
CPC ............ *G06F 1/324* (2013.01); *G06F 1/3206* (2013.01); *G06F 1/3296* (2013.01)

(58) Field of Classification Search
CPC ....... G06F 1/324; G06F 1/3296; G06F 1/3206
See application file for complete search history.

(56) References Cited

U.S. PATENT DOCUMENTS

| | | |
|---|---|---|
| 5,163,153 A | 11/1992 | Cole et al. |
| 5,522,087 A | 5/1996 | Hsiang |
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |

(Continued)

FOREIGN PATENT DOCUMENTS

EP 1 282 030 A1 5/2003

OTHER PUBLICATIONS

International Searching Authority, "Notification of Transmittal of the International Search Report and the Written Opinion of the International Searching Authority," dated Aug. 7, 2019, in International application No. PCT/US2019/026717.

(Continued)

*Primary Examiner* — Stefan Stoynov
(74) *Attorney, Agent, or Firm* — Trop, Pruner & Hu, P.C.

(57) ABSTRACT

In one embodiment, processor includes a first core to execute instructions, and a power controller to control power consumption of the processor. The power controller may include a hardware performance state controller to control a performance state of the first core autonomously to an operating system, and calculate a target operating frequency for the performance state based at least in part on an energy performance preference hint received from the operating system. Other embodiments are described and claimed.

18 Claims, 22 Drawing Sheets

(56) References Cited

U.S. PATENT DOCUMENTS

| | | | |
|---|---|---|---|
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,360,103 B2 * | 4/2008 | Lint | G06F 11/3419 710/16 |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 8,112,250 B2 * | 2/2012 | Floyd | G06F 1/3203 702/182 |
| 9,710,043 B2 | 7/2017 | Weissmann et al. | |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2010/0268968 A1 * | 10/2010 | Ghiasi | G06F 1/3203 713/300 |
| 2011/0145555 A1 | 6/2011 | Nayar et al. | |
| 2011/0154090 A1 | 6/2011 | Dixon et al. | |
| 2012/0079290 A1 | 3/2012 | Kumar | |
| 2012/0246506 A1 | 9/2012 | Knight | |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishnan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |
| 2013/0346774 A1 | 12/2013 | Bhandaru et al. | |
| 2014/0068290 A1 | 3/2014 | Bhandaru et al. | |
| 2014/0195829 A1 | 7/2014 | Bhandaru et al. | |
| 2014/0208141 A1 | 7/2014 | Bhandaru et al. | |
| 2016/0259392 A1 | 9/2016 | Weissmann et al. | |
| 2017/0145925 A1 | 5/2017 | Kusumi et al. | |
| 2017/0371399 A1 | 12/2017 | Weissmann et al. | |
| 2017/0373694 A1 | 12/2017 | Roithmeier et al. | |
| 2018/0060123 A1 | 3/2018 | Weissmann et al. | |
| 2018/0120924 A1 | 5/2018 | Weissmann et al. | |

OTHER PUBLICATIONS

Intel Developer Forum, IDF15, Efraim Rotem, "Intel® Architecture, Code Name Skylake Deep Dive: A New Architecture to Manage Power Performance and Energy Efficiency," 2015, 43 pages.

Intel Corporation, "Intel 64 and IA-32 Architectures Software Developer's Manual," vol. 3B: System Programming Guide, Sep. 2016, Chapter 14 Power and Thermal Management (14.1-14.9.5), 39 pages.

U.S. Appl. No. 15/849,995, filed Dec. 21, 2017, entitled "System, Apparatus and Method for Processor-External Override of Hardware Performance State Control of a Processor," by Nikhil Gupta, et al. (3707).

* cited by examiner

SYSTEM, APPARATUS AND METHOD FOR RESPONSIVE AUTONOMOUS HARDWARE PERFORMANCE STATE CONTROL OF A PROCESSOR

TECHNICAL FIELD

Embodiments relate to power management of a system, d more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
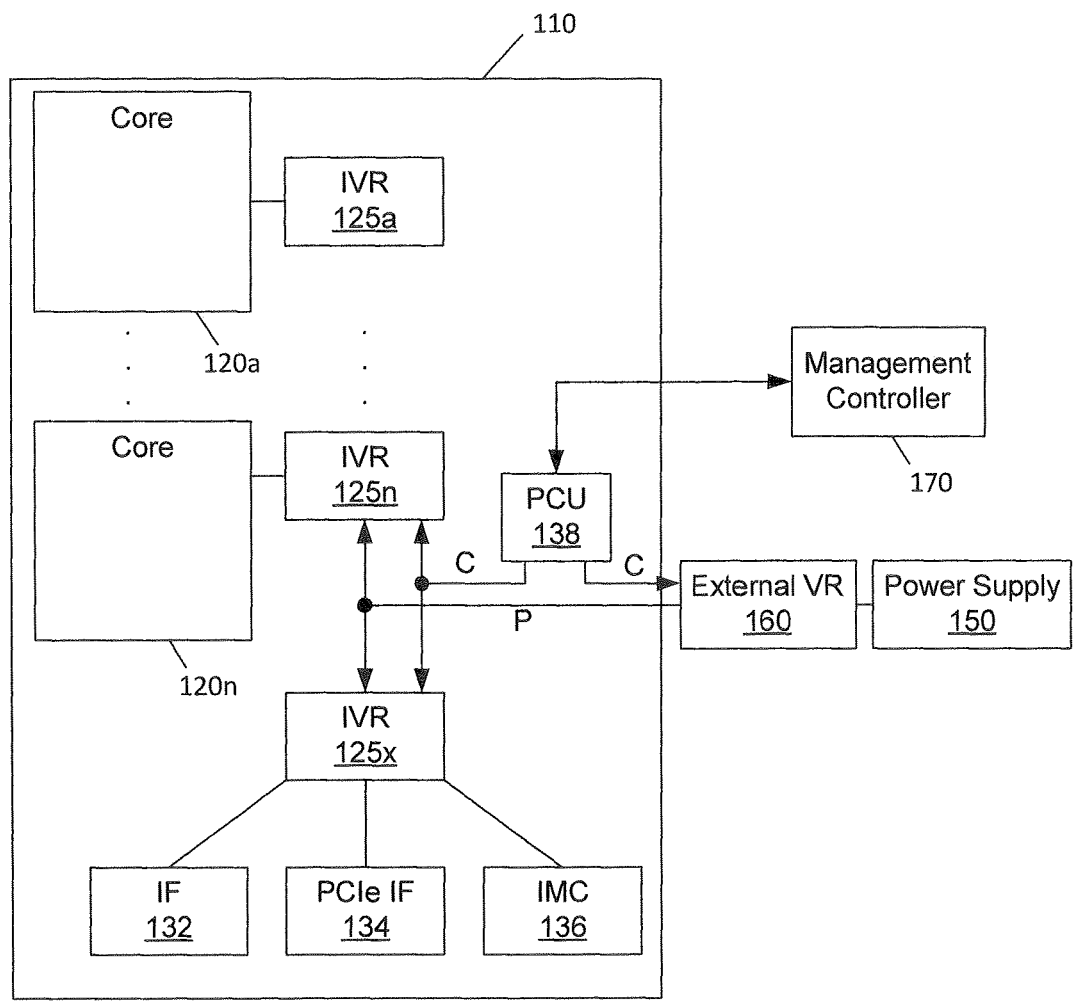
FIG. 1 is a block diagram of a portion of a system in accordance with an embodiment of the present invention.

In various embodiments, a processor or other system on chip (SoC) includes a power controller that may, autonomously to an operating system (OS) or other system software, control performance states (P-states) of one or more processor cores or other processing elements of the processor. By using a hardware performance state (HWP) controller, reduced latency may be realized for dynamically determining an appropriate performance state and controlling entry into and exit from such performance state.

This autonomous power control enables greater allocation of power available to the processor in a manner that may increase performance. The autonomous hardware power control can be based at least in part on configuration parameters provided by an OS, virtual machine monitor (VMM), or other system software. In embodiments, a processor may include a power controller that can perform dynamic performance control of performance states of one or more cores or other processing circuits of the processor according to an OS-based mechanism such as an Advanced Configuration and Power Interface (ACPI) mechanism or other OS native support. Still further, this power controller can autonomously select performance states while utilizing OS and/or thread-supplied performance guidance hints, referred to as HWP or Intel® Speed Shift Technology. When HWP is active, processor hardware such as the power controller may autonomously select performance states as deemed appropriate for the applied workload and with consideration of, e.g., OS-based hints, including minimum and maximum performance limits, preference towards energy efficiency or performance, and the specification of a relevant workload history observation time window, as examples.

Still further, with embodiments as described herein, the HWP controller or other performance state control hardware mechanism may receive and use the hint information provided by the OS to determine an appropriate performance state and effect such control with low latency in a user-responsive manner. Although the scope of the present invention is not limited in this regard, in embodiments the hint information provided by the OS or other system software may be in the form of a hint value that provides an indication of a relative preference between performance and energy conservation. As the OS or other system software has a better understanding of the nature of particular workloads to be executed (e.g., whether they are compute-intensive, memory-intensive, user-facing or so forth) and system environment (including whether a system is operating on battery or AC power), this hint information may be leveraged in identifying an appropriate performance state.

Still further, embodiments may leverage the expectation that future OSs will provide hint information at higher frequencies than currently available. Embodiments may leverage this information in a more robust and low latency manner to determine appropriate performance states based at least in part on this hint information.

Although embodiments herein describe this hint information in the form of a so-called energy performance preference (EPP) value, which may be provided by the OS to hardware circuitry of the processor, the scope of the present invention is not limited in this regard. That is, in other embodiments scheduler-based hint information may be received in other manners and potentially from other entities. Further as will be described herein, the HWP controller may directly use this hint information to determine an appropriate performance state and cause control circuitry of the processor to effect updates to current performance states.

In contrast, typical autonomous P-state techniques control operating frequency based only on average active state utilization and current frequency, and instead set utilization thresholds for making increase/decrease frequency decisions according to an EPP value. As a result, these typical mechanisms are not fast enough in adapting to changes to the EPP value. Stated another way, with a typical technique, when an EPP change occurs it takes a relatively long time and multiple frequency changes to settle on an appropriate frequency, due to the iterative nature of this typical control technique. For example, with this typical technique, it may take approximately 15 milliseconds or more for a performance state change to iterate to a final result. Instead with an embodiment, a total time for changing performance state in response to an EPP change may be on the order of approximately 1 ms.

In an embodiment, a P-state control algorithm in accordance with an embodiment is based on Amdahl's law. Such algorithm operates to directly predict a target frequency that brings the active state utilization (also referred to herein as C0 utilization) to a target level, based on an average C0 utilization (and thus is robust to short changes in C0 utilization), average frequency (and thus is robust to short changes in frequency), and target utilization which depends on EPP. Since the target utilization is derived from the EPP value itself and the algorithm directly predicts a target frequency to achieve to the target utilization, the algorithm responds very fast to EPP changes. As such, embodiments can track EPP changes very fast (in one cycle of the algorithm) while being robust to short changes in frequency or utilization. Using an embodiment, immediate responses to changes in performance state may be realized when an OS changes the energy performance preference. Following the OS change, in a single iteration of an HWP control algorithm, the hardware calculates a target operating frequency that brings the C0 utilization to the OS target utilization.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores 120$_a$-120$_n$. In addition, each core may be associated with an integrated voltage regulator (IVR) 125$_a$-125$_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator 125$_x$. In one embodiment, interface 132 may be enable operation for an Intel®. Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

Furthermore, while FIG. 1 shows an implementation in which PCU 138 is a separate processing engine (which may be implemented as a microcontroller), understand that in some cases in addition to or instead of a dedicated power controller, each core may include or be associated with a power control agent to more autonomously control power consumption independently. In some cases a hierarchical power management architecture may be provided, with PCU 138 in communication with corresponding power management agents associated with each of cores 120.

One power management logic unit included in PCU 138 may be a hardware performance state controller. Such hardware performance state controller may be implemented as a hardware circuit that can autonomously control performance states of one or more cores 120 or other logic units of processor 110. In some cases, the hardware performance state controller may directly use the hint information provided by an OS to autonomously determine an appropriate performance state. Additional power control may be performed in some cases in response to information from a management controller 170, which is a processor-external hardware component of system 100. Although the scope of the present invention is not limited in this regard, in embodiments management controller 170 may be implemented as a power management integrated circuit (PMIC), baseboard management controller or so forth.

While not shown for ease of illustration, understand that additional components may be present within processor 110 such as additional control circuitry, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. Embodiments described herein may enable dynamic changes to the guaranteed frequency of the P1 performance state, based on a variety of inputs and processor operating parameters. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
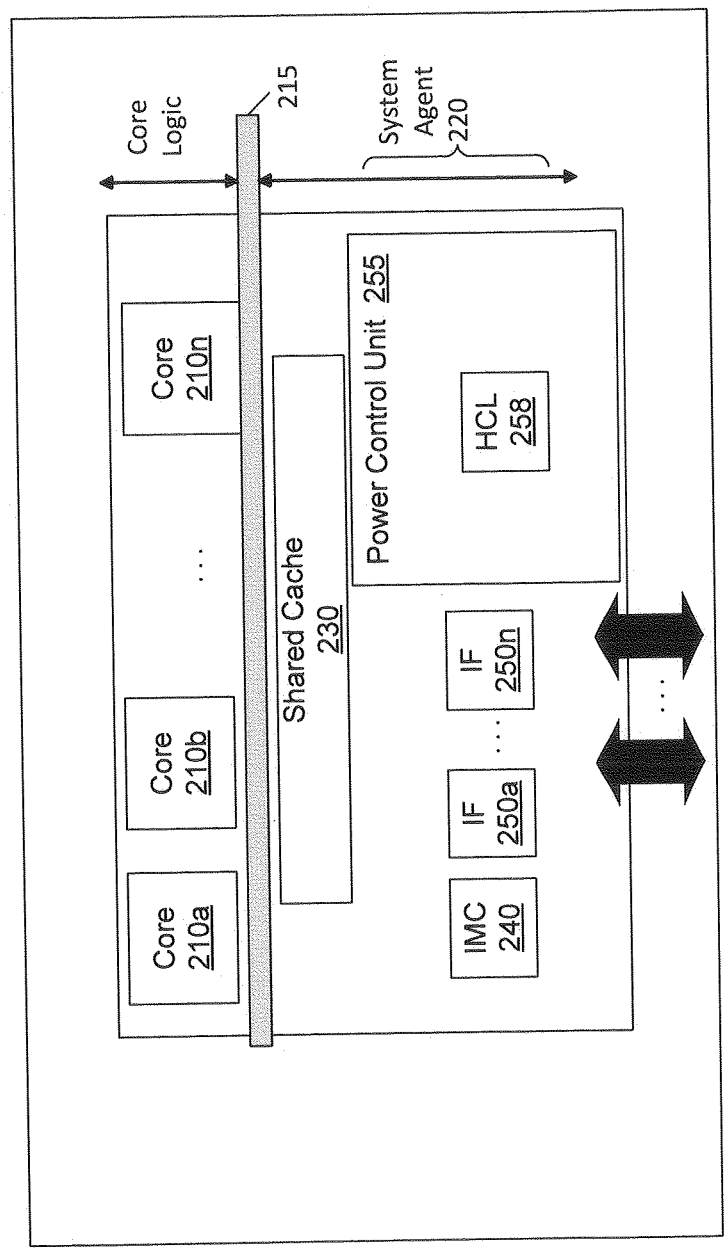
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores 210$_a$-210$_n$. In one embodiment, each such core may be of an independent power domain and can be configured to enter and exit active states and/or maximum performance states based on workload. The various cores may be coupled via an interconnect 215 to a system agent 220 that includes various components. As seen, system agent 220 may include a shared cache 230 which may be a last level cache. In addition, the system agent may include an integrated memory controller 240 to communicate with a system memory (not shown in FIG. 2), e.g., via a memory bus. System agent 220 also includes various interfaces 250 and a power control unit 255, which may include logic to perform the power management techniques described herein. In the embodiment shown, power control unit 255 includes hardware performance state control logic (HCL) 258 that may perform autonomous performance state control within processor 200 to determine an appropriate performance state directly using OS-provided hints, as described herein. In an embodiment, HCL 258 may calculate a target operating frequency for the determined performance state for one or more cores 210 based at least in part on an EPP hint received from the OS, as described herein.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
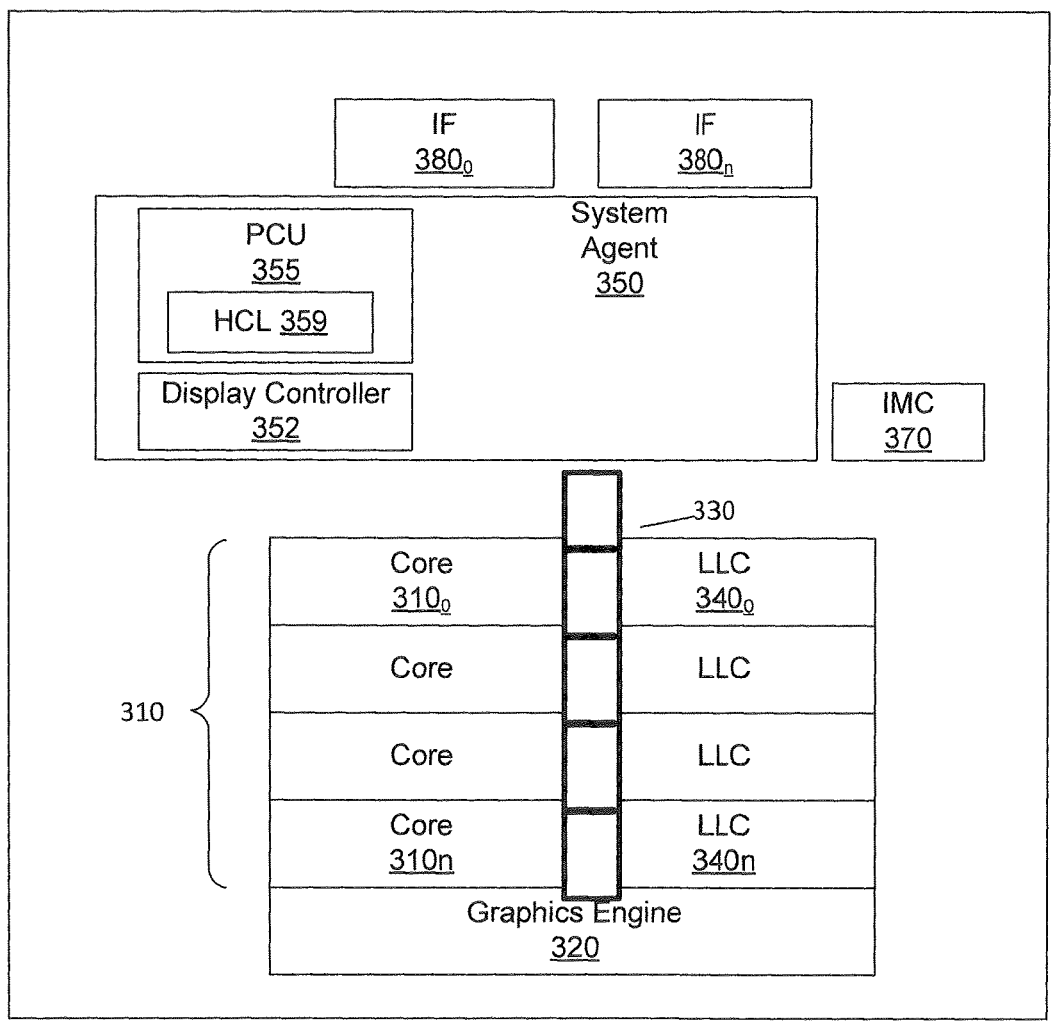
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein. In the embodiment shown, power control unit 355 includes a hardware performance state control logic 359 which may, inter alia, directly use OS-provided hint information to calculate a target operating frequency for an appropriate performance state for one or more of cores 310.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
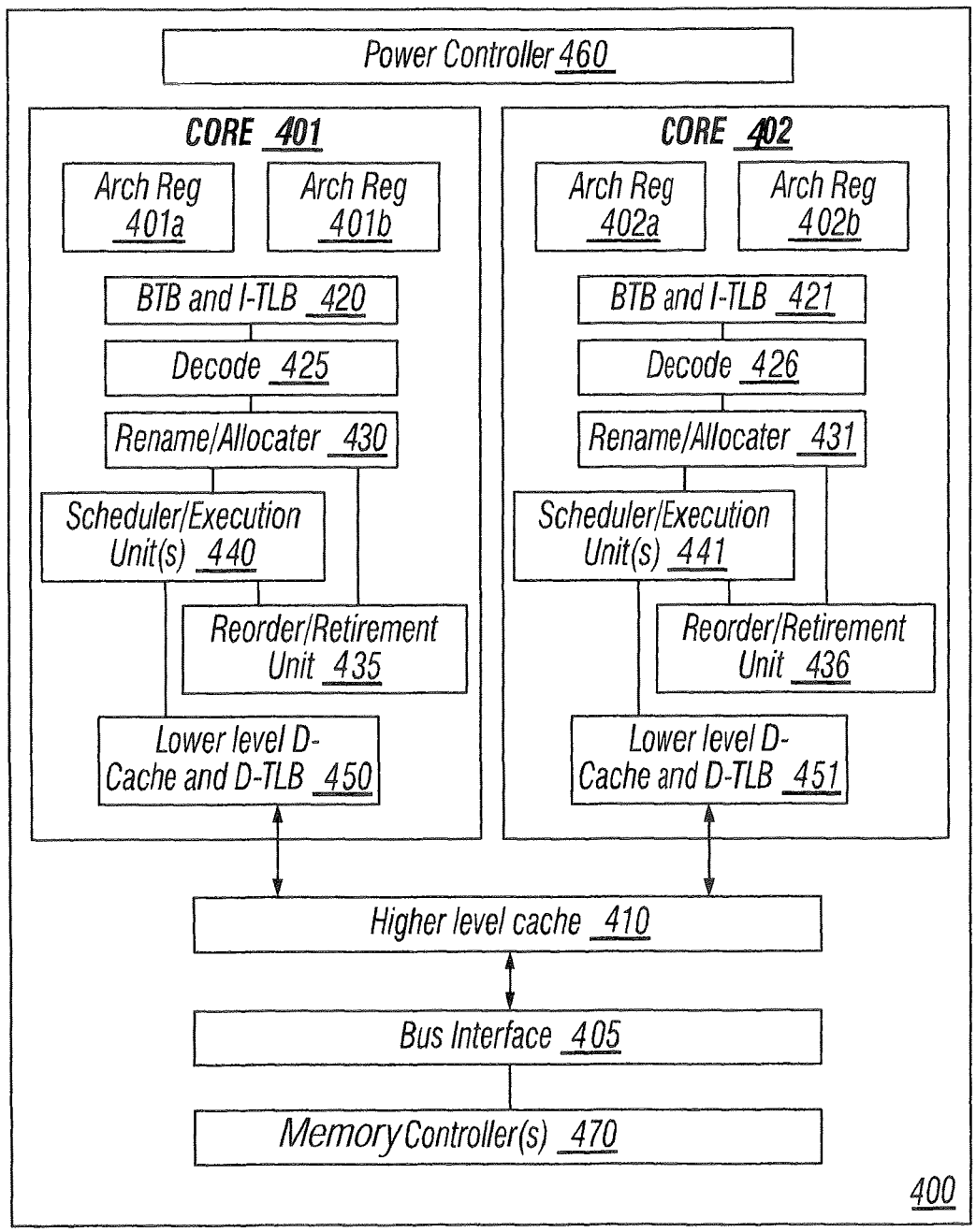
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401*a* and 401*b*, which may also be referred to as hardware thread slots 401*a* and 401*b*. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401*a*, a second thread is associated with architecture state registers 401*b*, a third thread may be associated with architecture state registers 402*a*, and a fourth thread may be associated with architecture state registers 402*b*. Here, each of the architecture state registers (401*a*, 401*b*, 402*a*, and 402*b*) may be referred to as processing elements, thread slots, or thread units, as described above. As illustrated, architecture state registers 401*a* are replicated in architecture state registers 401*b*, so individual architecture states/contexts are capable of being stored for logical processor 401*a* and logical processor 401*b*. In core 401, other smaller resources, such as instruction pointers and renaming logic in allocator and renamer block 430 may also be replicated for threads 401*a* and 401*b*. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401*a*, 401*b*, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401*a* and 401*b* are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
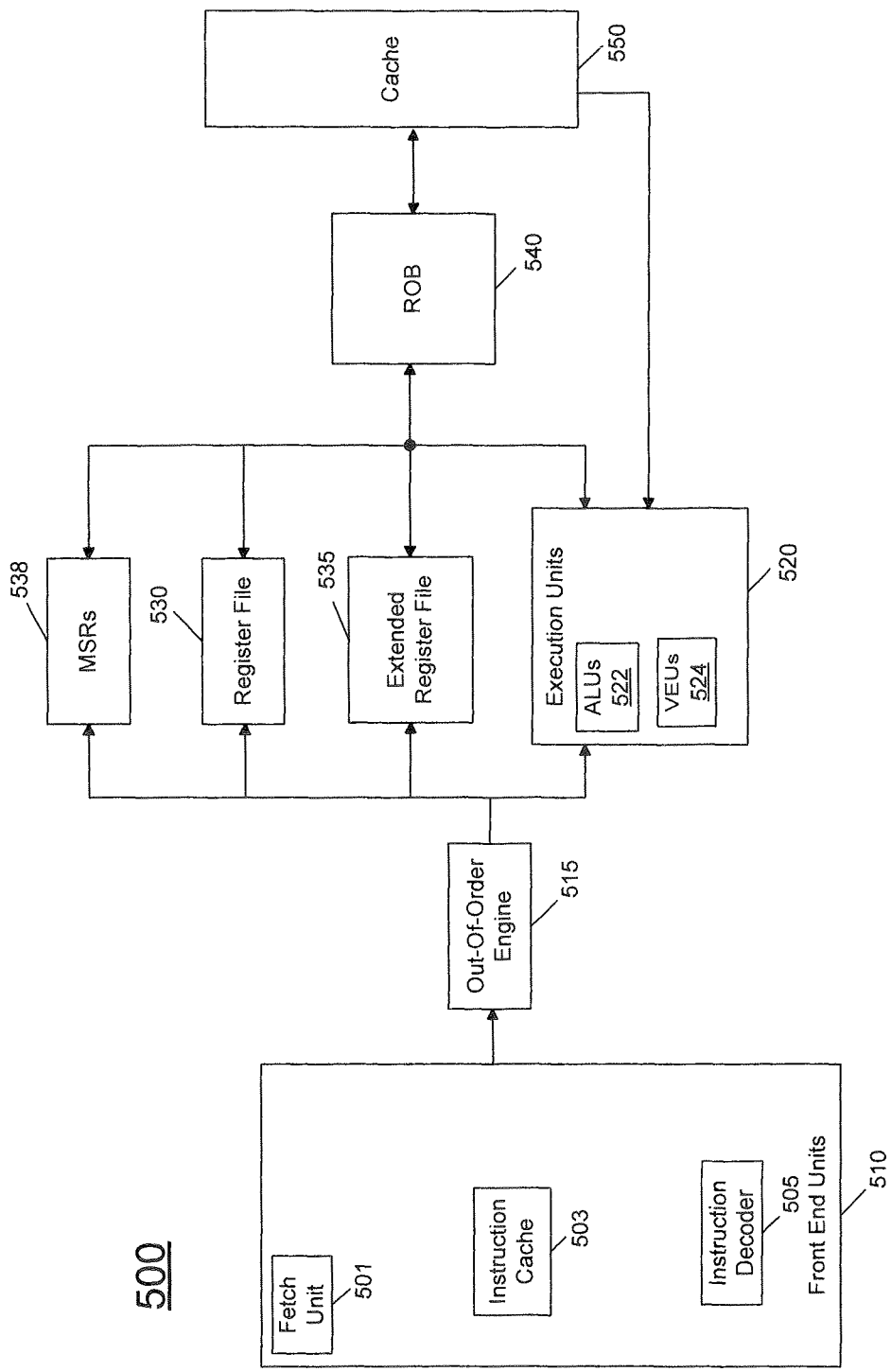
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register. For purposes of configuration, control, and additional operations, a set of machine specific registers (MSRs) 538 may also be present and accessible to various logic within core 500 (and external to the core) such as HWP MSRs.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
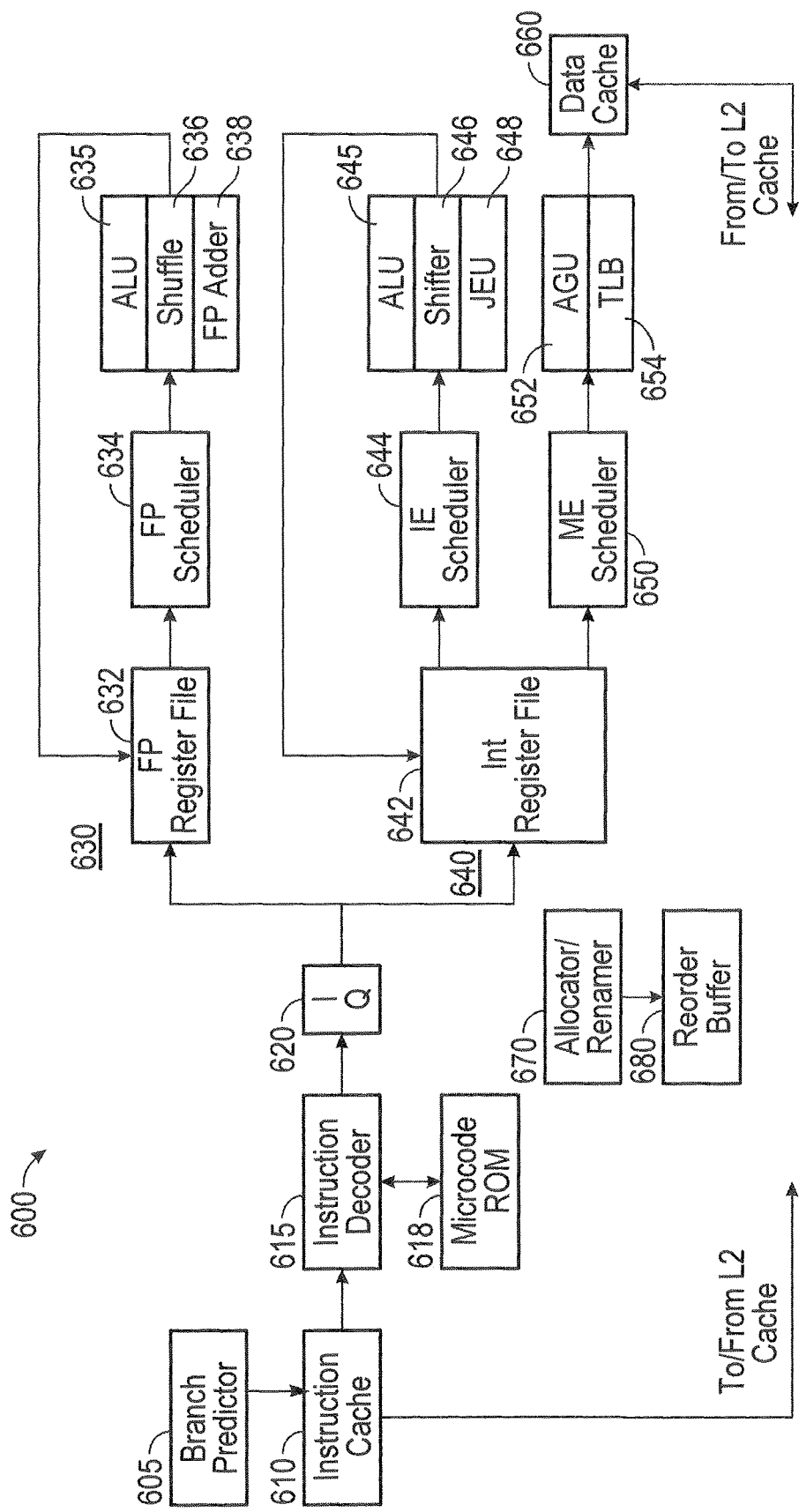
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel®. Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
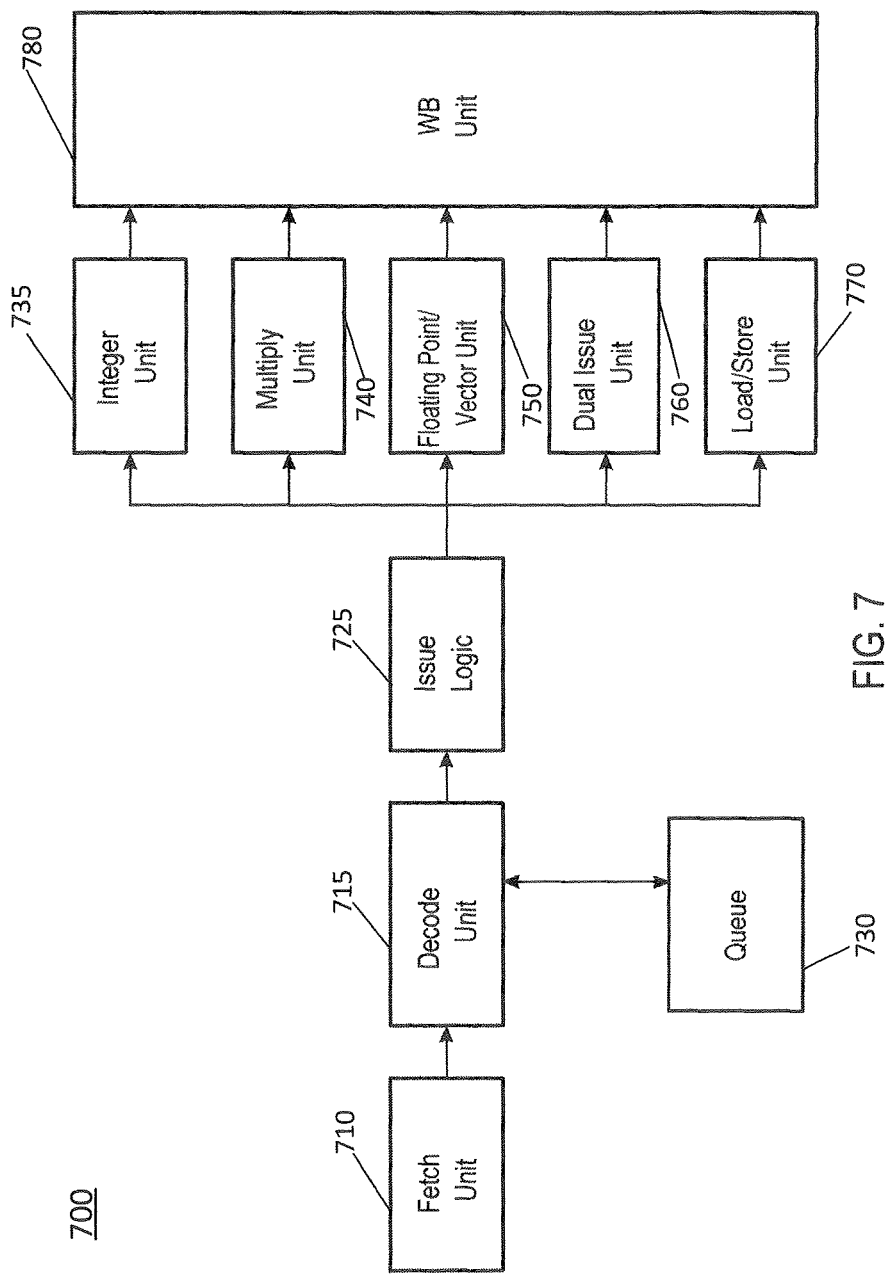
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
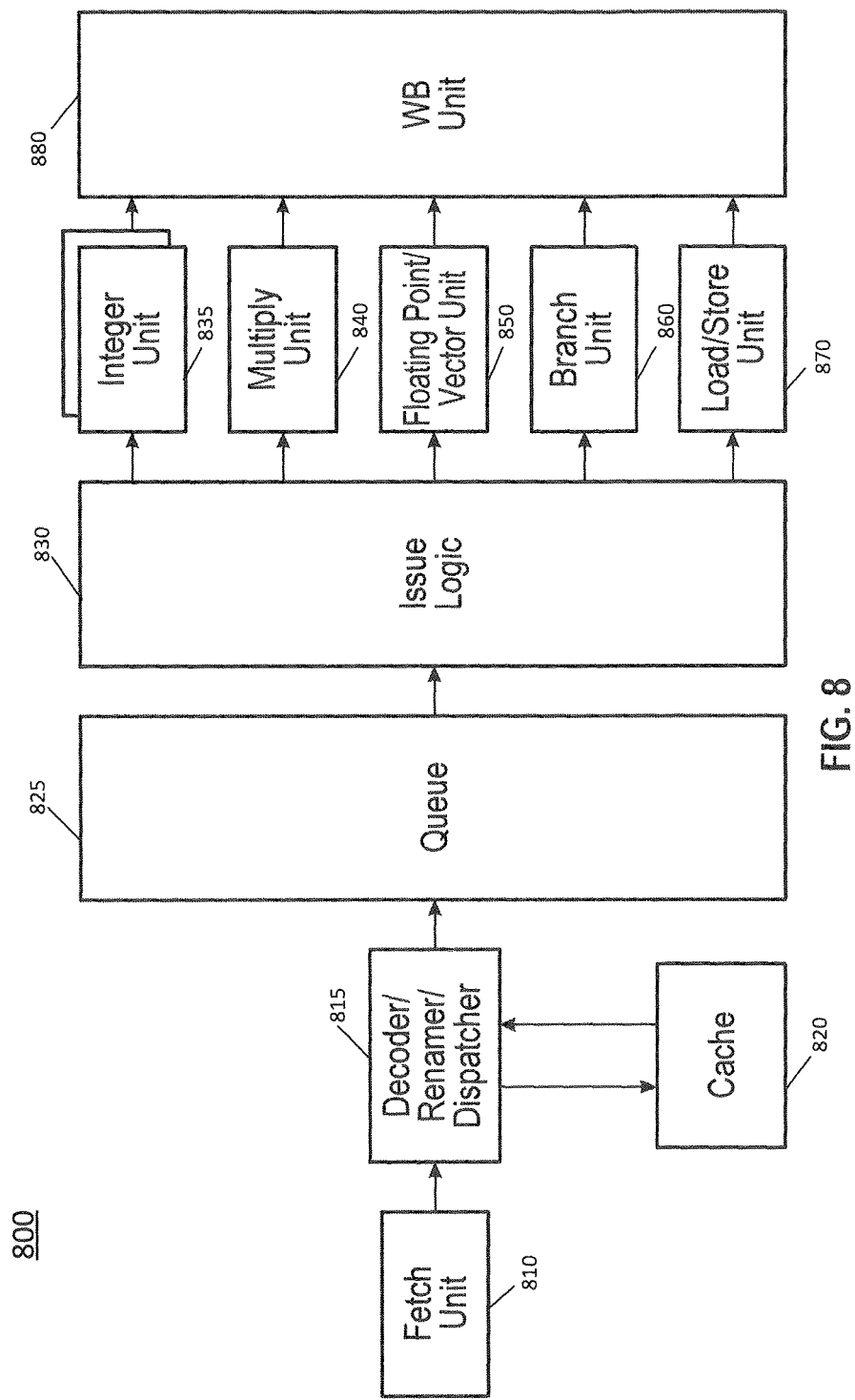
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
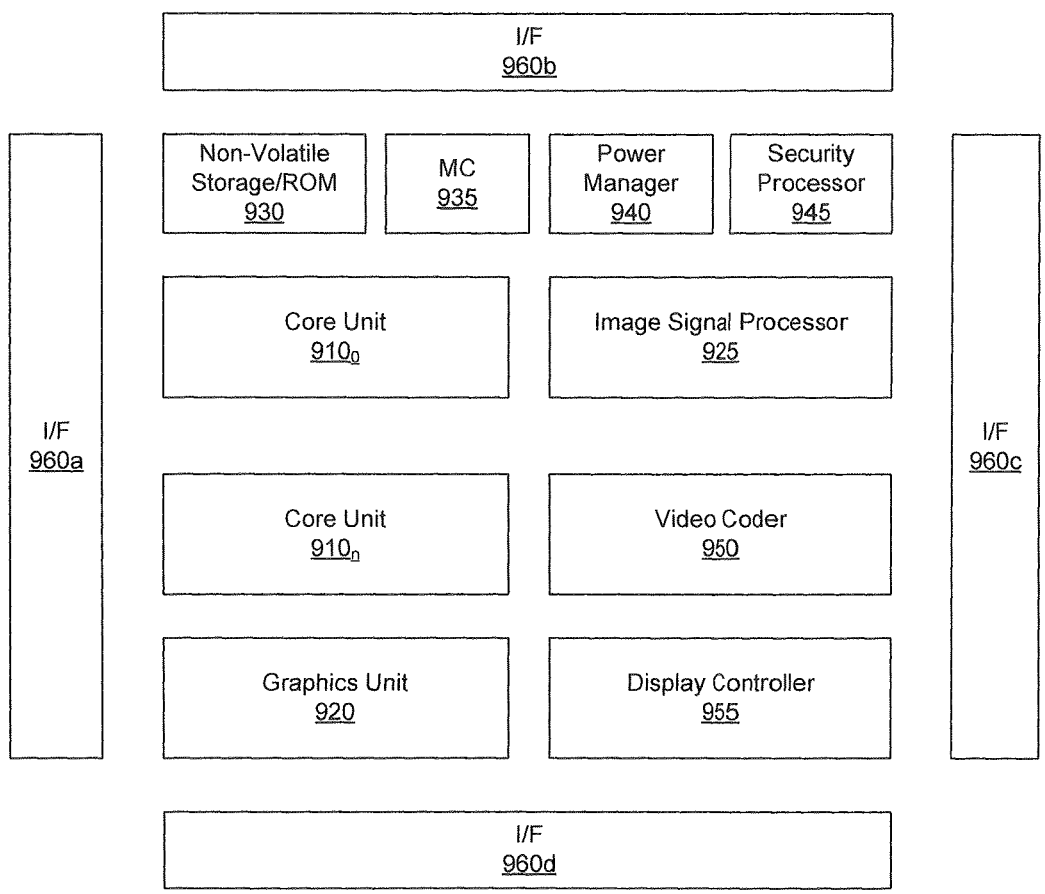
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device or connected device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
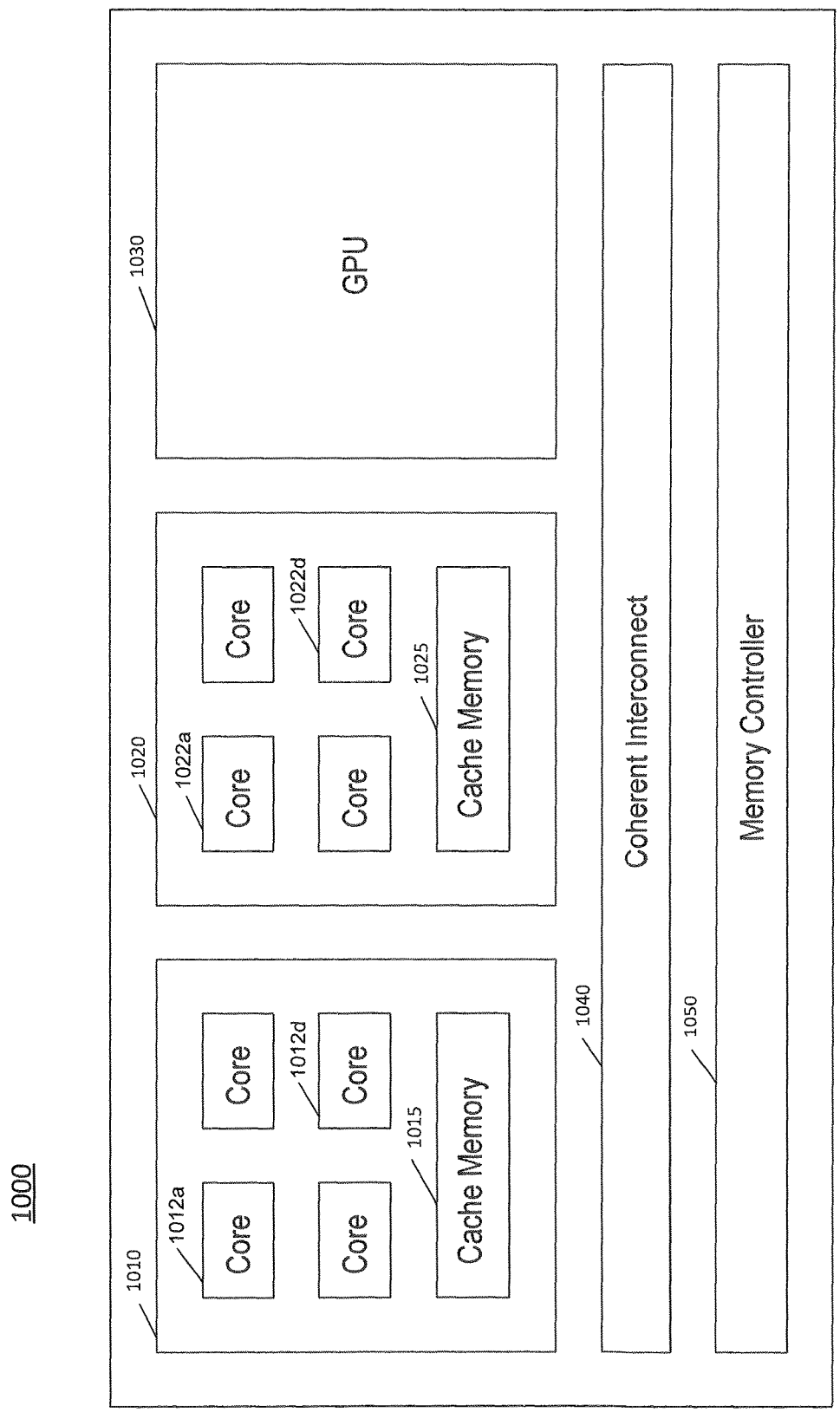
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel® and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
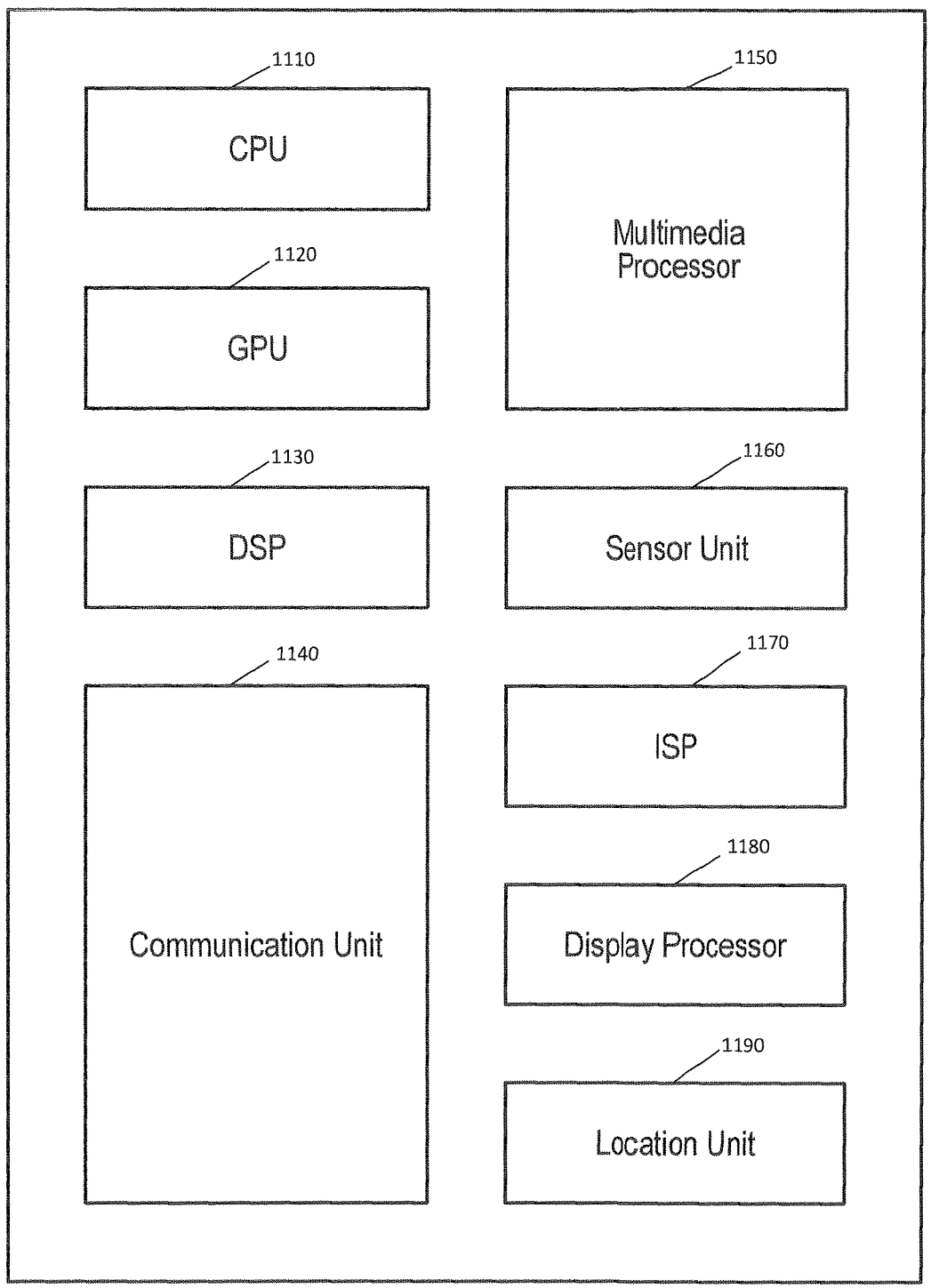
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
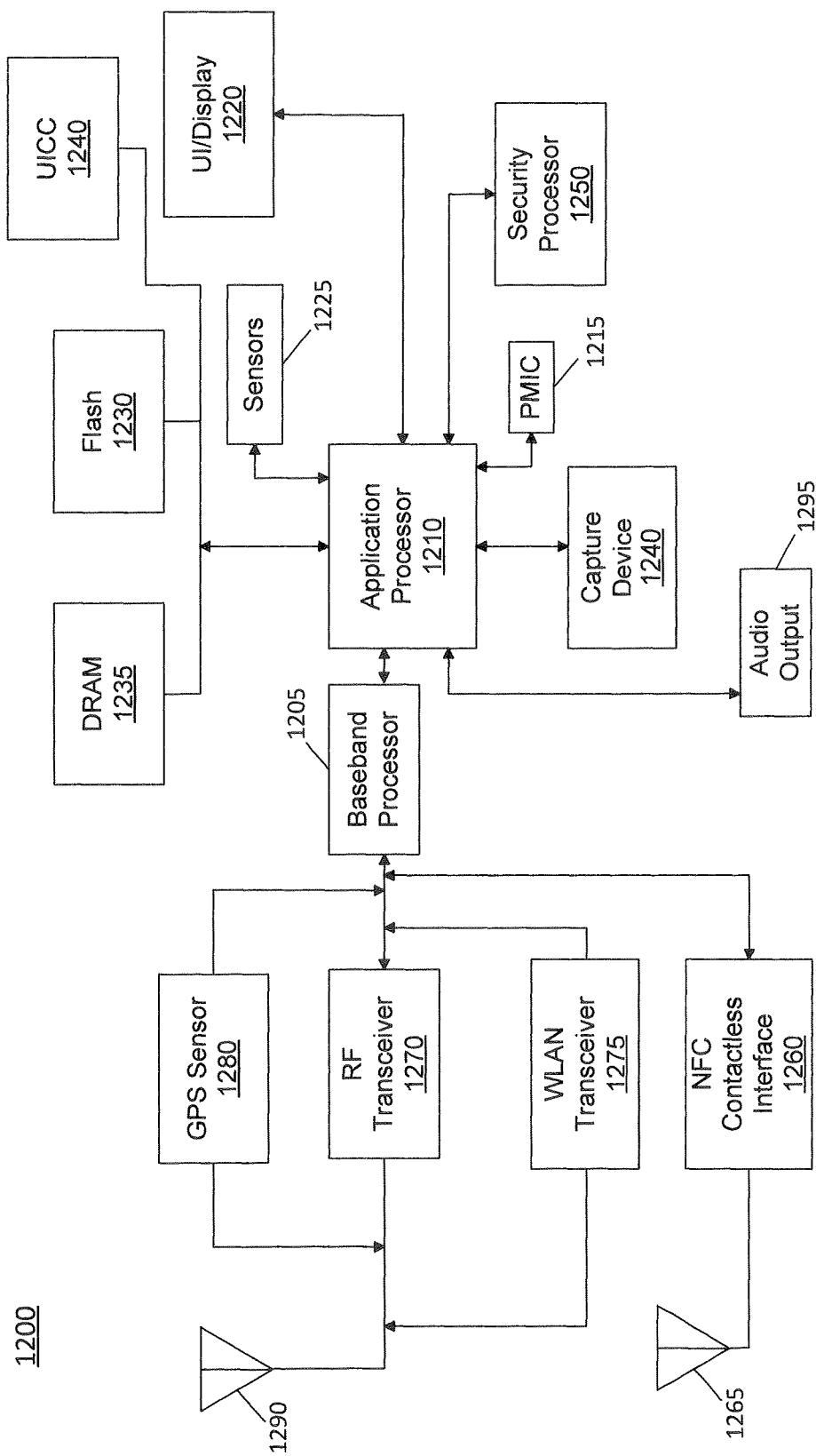
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device and perform the power management techniques described herein.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contact less interface 1260 is provided that communicates in a NFC near field via an NFC antenna 1265. While separate antennae are shown in FIG. 12, understand that in some implementations one antenna or a different set of antennae may be provided to enable various wireless functionality.

A PMIC 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
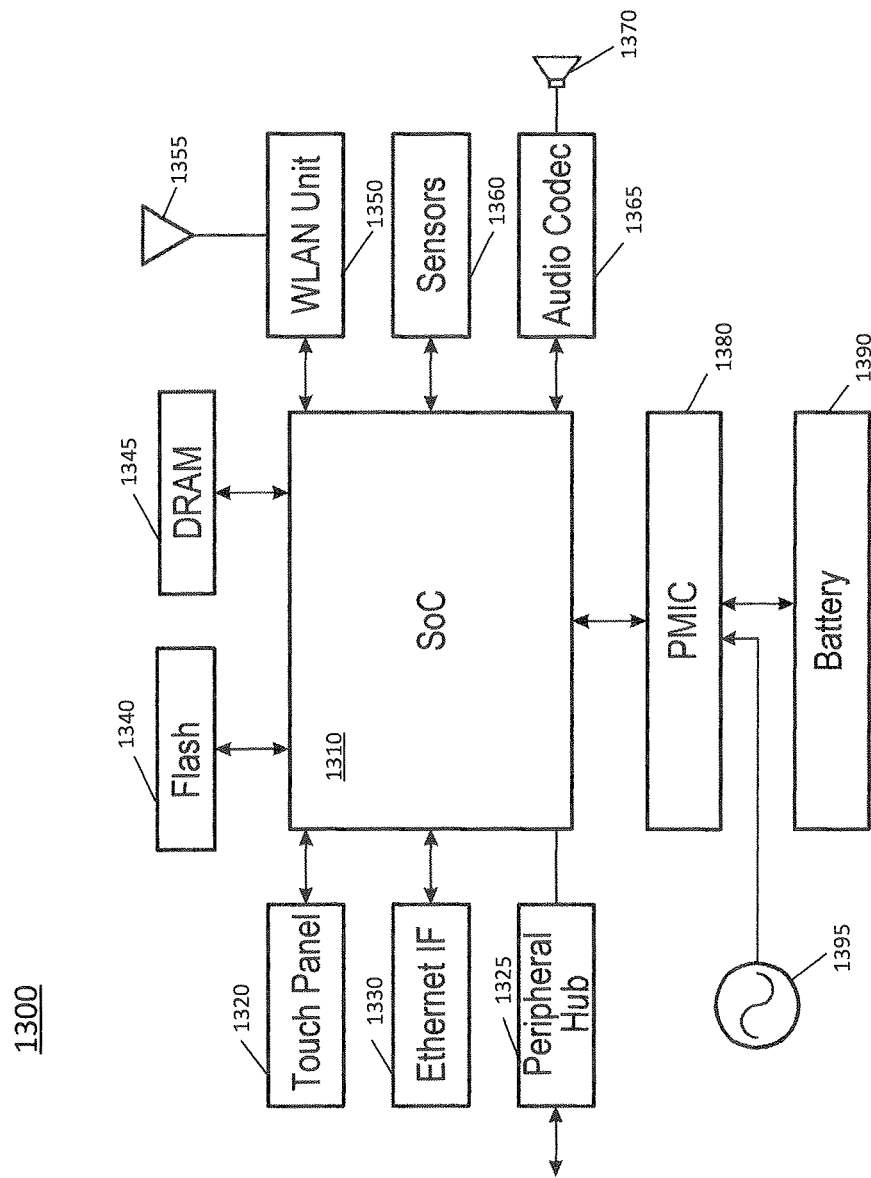
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device and perform the power management techniques described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
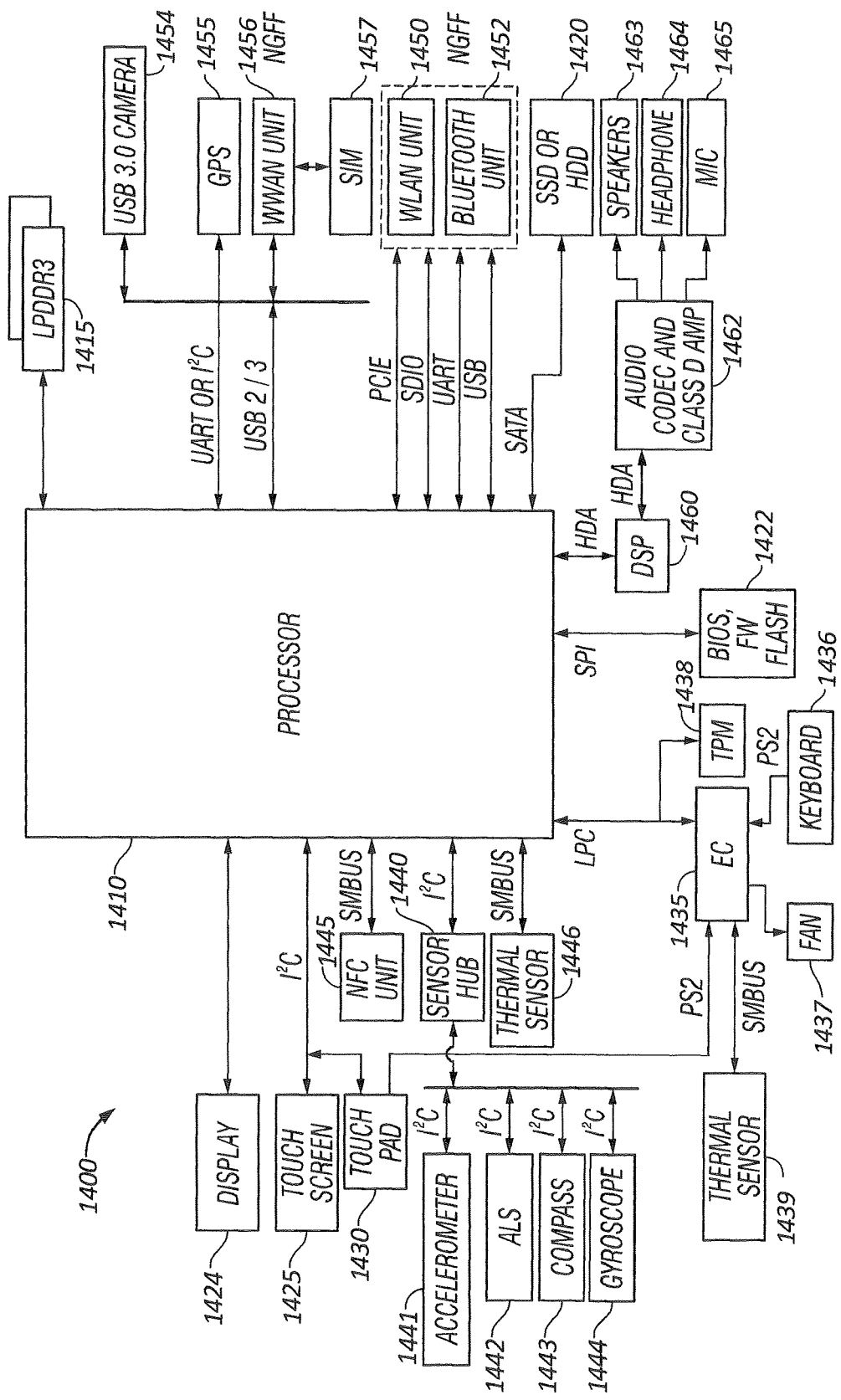
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other flimware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I.sup.2C interconnect. As further shown in FIG. 14, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an $I_{2C}$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
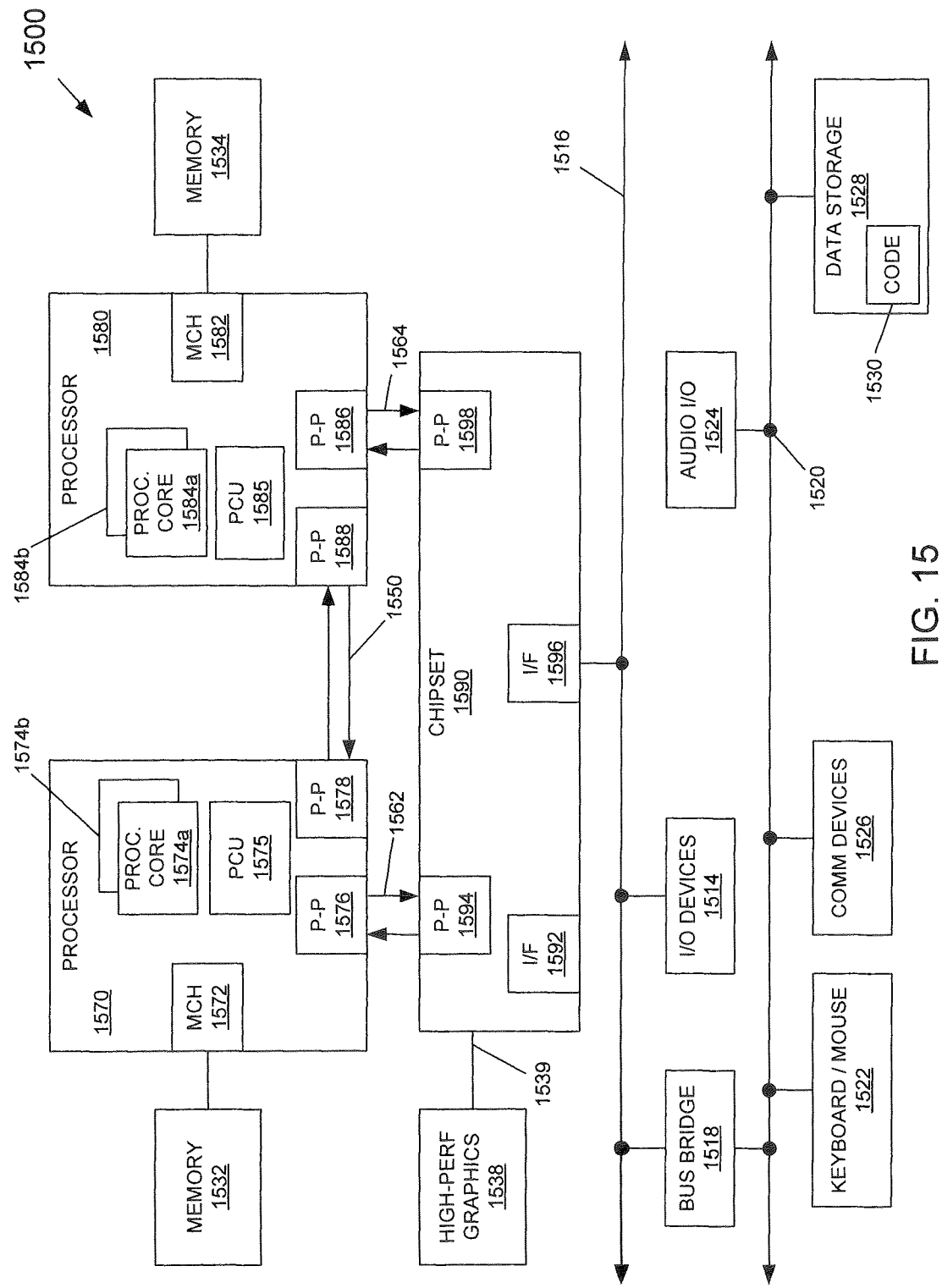
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processors 1574a and 1574b and processor cores 1584a and 1584b), although potentially many more cores may be present in the processors. Each of the processors can include a PCU 1575, 1585 to perform processor-based power management, including the HWP control of processor cores that directly uses OS-provided hint information as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
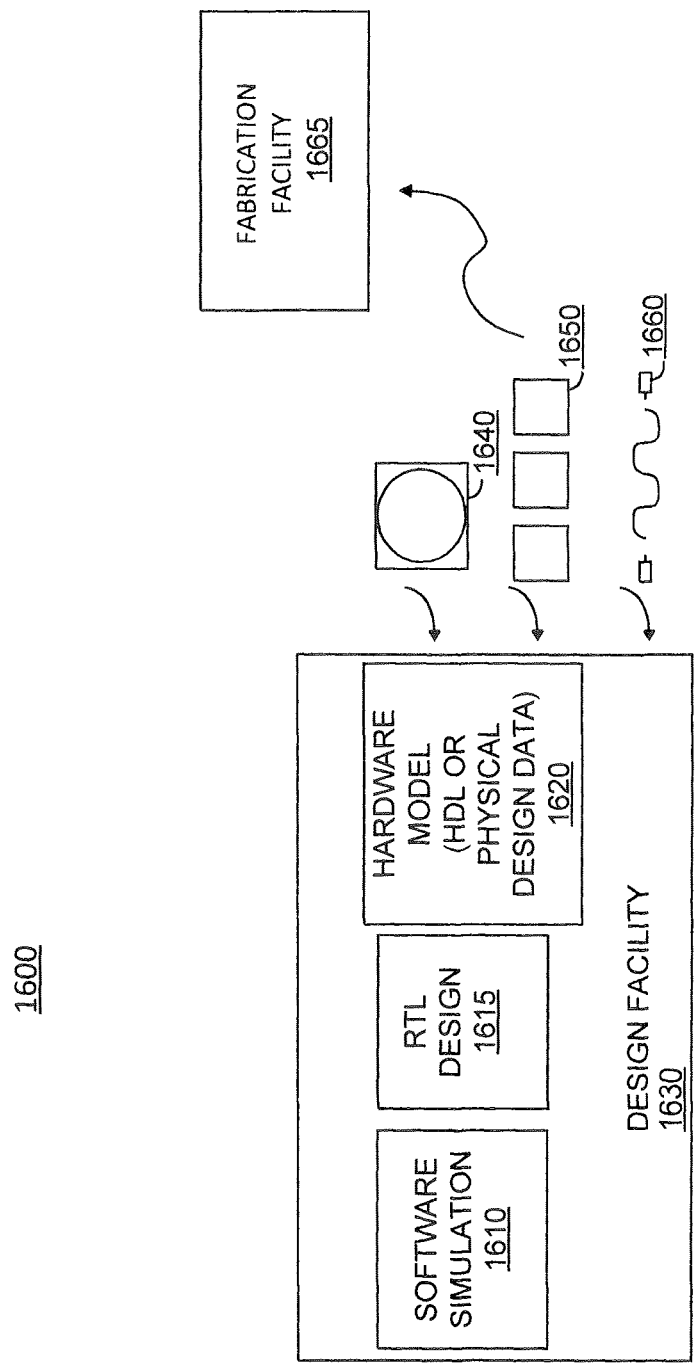
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, re-usable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be farther synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

Figure 17:
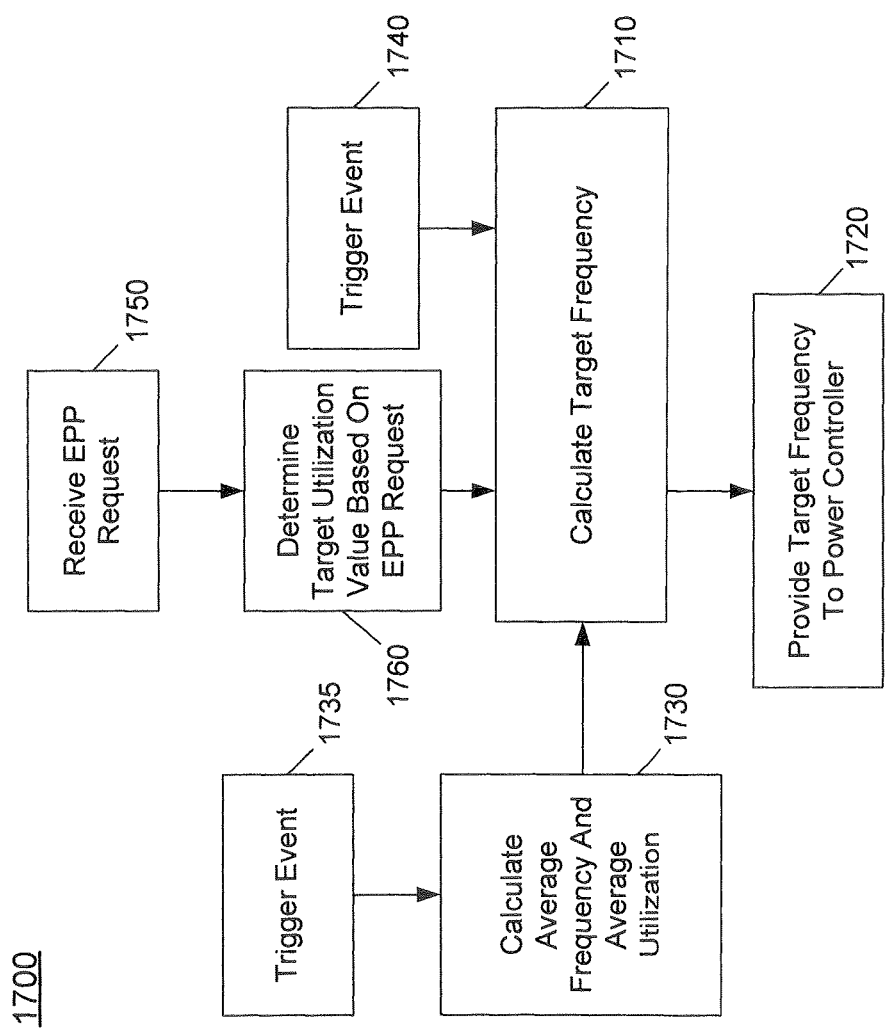
FIG. 17 is an operation flow for autonomous hardware performance state control in accordance with an embodiment.

Referring now to FIG. 17, shown is an operation flow for autonomous hardware performance state control in accordance with an embodiment. Hardware circuitry of a processor, such as a HWP controller (which itself may be included in a power controller of the processor), may perform operation flow 1700. As such, operation flow 1700 may be executed by hardware circuitry, firmware, software and/or combinations thereof.

As illustrated in FIG. 17, operation flow 1700 may be used to calculate a new target frequency (operation 1710). As will be described herein, in a particular embodiment this new target operating frequency may be calculated based at least in part on multiple parameters, including an average utilization value, an average frequency value and a target utilization value. Upon calculation of the new target frequency, at block 1720 this new target frequency may be provided to a power controller to cause one or more processing engines of the processor (e.g., one or more cores, graphics processors or other processing units) to execute at the target frequency. For example, a power controller may include a P-state controller to cause clock generation circuitry and voltage generation circuitry to operate at a given performance state using this new target frequency.

Still with reference to FIG. 17, note that the various inputs for calculating a new target frequency, including target utilization value, average frequency and average utilization, may be provided to the HWP controller. In one embodiment, during runtime of the processor, an average frequency and an average utilization may be calculated (block 1730). In embodiments, a trigger event 1735 may occur to cause these calculations to be performed. Although the scope of the present invention is not limited in this regard, in one embodiment these average values may be calculated periodically according to a trigger event occurring at a given evaluation interval, which may be on the order of between 100 microseconds and 10 milliseconds; of course other ranges of time are possible in other embodiments. In an embodiment, the runtime calculation of average frequency and utilization may be done according to an exponentially weighted moving average (EWMA) function or another mathematical model. Note that the target frequency calculation may be performed according to another trigger event, which may be set at the same or different evaluation interval. In an embodiment, this trigger event may be set according to execution within a so-called P-code, which may be microcode stored in a non-volatile storage, e.g., accessible to the power controller, to enable the power controller to perform various processor power management operations.

Still seen in FIG. 17, at block 1750 a request may be received, e.g., from an operating system or other system software, to set a new value for an energy performance preference (EPP). As an example, the OS may send an EPP value whenever a workload change occurs, for example, when new processes are initiated, upon a context switch or so forth. In one embodiment, the EPP value can further be provided via XSAVE/XRESTORE instructions and not explicitly by an OS write. Thus in an embodiment, the target utilization value may be calculated periodically or as a result of triggering of a new target utilization. At block 1760 this EPP value may be used to determine the target utilization value. In one particular embodiment, this determination may be based on an access to a lookup table with the target EPP value to identify a target utilization value corresponding to the EPP value. Understand while shown at this high level in the embodiment of FIG. 17, many variations and alternatives are possible. Note further that the various operation blocks described in FIG. 17 may be performed in different locations within a power controller or other hardware circuitry of a processor and as described, these operations may be performed according to different evaluation intervals and at different points during processor operation.

Figure 18:
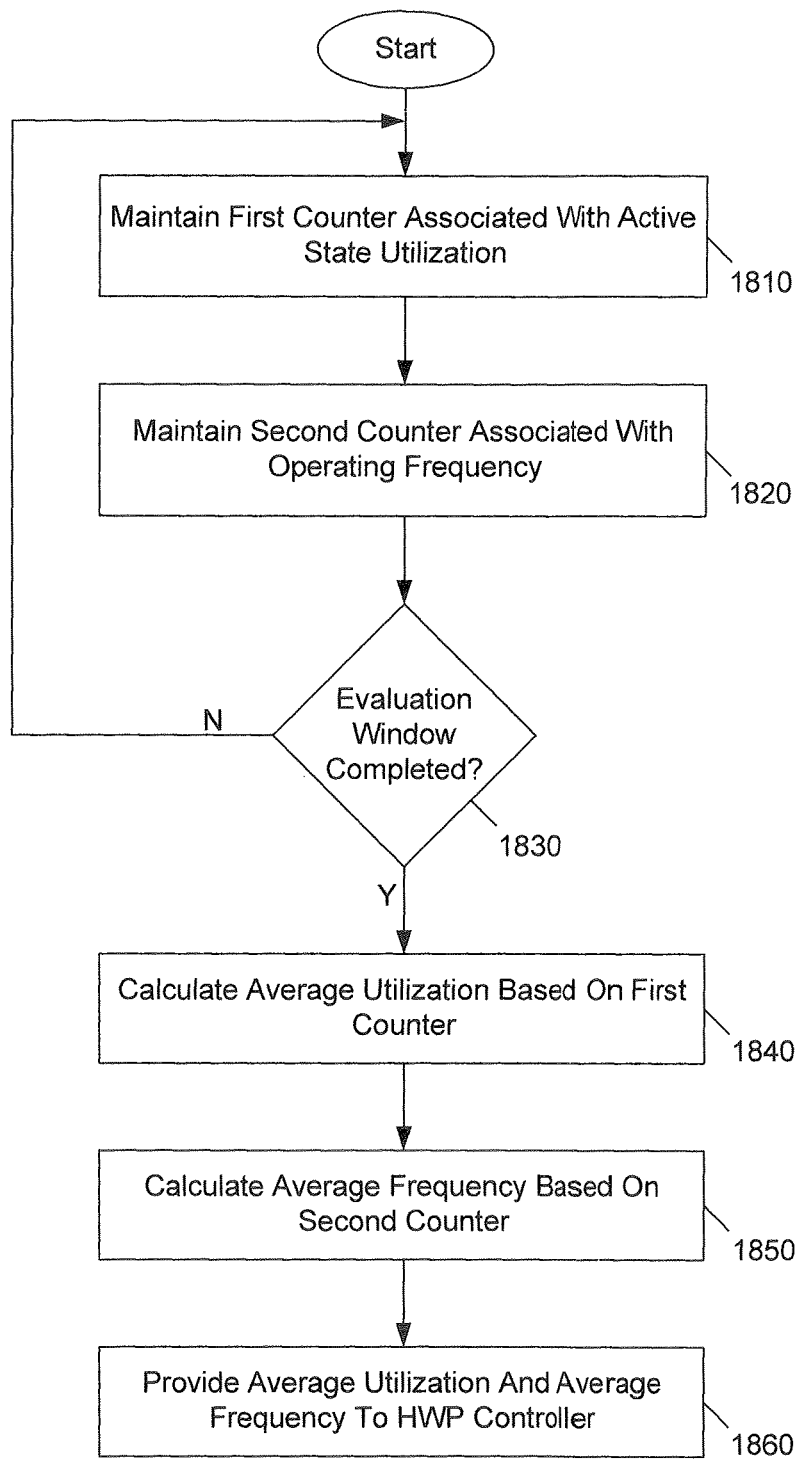
FIG. 18 is a flow diagram of a method in accordance with an embodiment of the present invention.

Referring now to FIG. 18, shown is a flow diagram of a method in accordance with an embodiment of the present invention. In embodiments, method 1800 may be performed by hardware circuitry, software, firmware and/or combinations thereof. In a particular embodiment, method 1800 may be performed by control circuitry, e.g., of a power controller of a processor. As illustrated, method 1800 is a method for determining average operating parameters to be used in HWP operations as described herein.

As seen, method 1800 begins by maintaining a first counter (block 1810). This first counter is a utilization counter that, in an embodiment, may maintain an active residency count. As such, this first counter may be configured to increment its count value, e.g., by one, for each clock cycle in which the corresponding processing element (e.g., core, other processing engine, or overall processor) is in an active C0 state. Next at block 1820 a second counter may be maintained. This second counter is a frequency counter that, in an embodiment, may maintain count information as to an operating frequency.

Then as further illustrated in FIG. 18, at diamond 1830 it is determined whether an evaluation window has completed. If not, further counting operations and maintenance of these counters may occur. Otherwise if it is determined that the evaluation window (which may be on the order of between approximately 100 microseconds and 10 milliseconds) has completed, control passes to block 1840. With an EWMA function, this time value is used as a Tau value. Note that in some embodiments, a period of this time window may be derived, at least in part, from the EPP value. In other embodiments, the EPP value can be driven from other system parameters e.g., at a low battery state of charge, more energy efficient operation can be selected (possibly via system software). At block 1840, an average utilization value may be calculated. This average utilization value is a moving average of the utilization value for the processor, such as an average percentage of overall processor cycles in which the relevant core, processing engine and/or processor was in an active state. In turn, at block 1850 an average frequency value may be calculated. This average frequency value is a moving average of the operating frequency of the processor overall, and/or of a relevant core or other processing engine. At block 1860, these average values are provided to the HWP controller. Understand while shown at this high level in the embodiment of FIG. 18, many variations and alternatives are possible.

Figure 19:
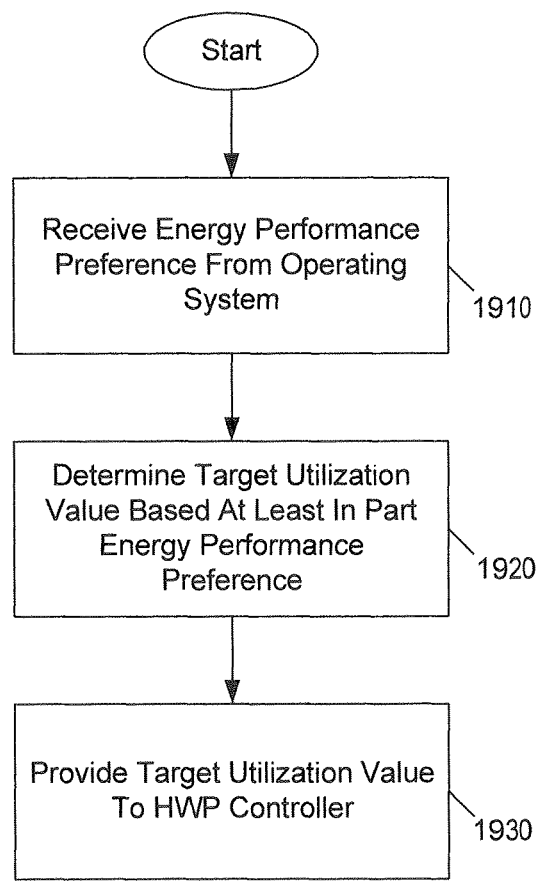
FIG. 19 is a flow diagram of a method in accordance with another embodiment of the present invention.

Referring now to FIG. 19, shown is a flow diagram of a method in accordance with another embodiment of the present invention. In the embodiment of FIG. 19, method 1900 is a method for determining a target utilization value. In an embodiment, this determination may be performed by control circuitry of a power controller, and as such may be performed by hardware circuitry, software, firmware and/or combinations thereof.

As illustrated, method 1900 begins by receiving an energy performance preference from an operating system (block 1910). This EPP value may be received from the OS, e.g., in response to a context switch, creation of a new process or thread, or in many other instances. In an embodiment, the OS may communicate this EPP value by way of an update to an HWP register, e.g., an HWP request register. In an embodiment, the EPP value can be communicated by system software (e.g., driver or system management software). Control next passes to block 1820 where a target utilization value may be determined based at least in part on this energy performance preference value. In one embodiment, the control circuitry may maintain a lookup table that has multiple entries, each of which associates an EPP value (or EPP range) with a corresponding target utilization value. As such, the received EPP value may be used to lookup a corresponding target utilization value within the lookup table. Of course in other embodiments, different manners of determining a target utilization value based on a received EPP can occur.

Still with reference to FIG. 19, control passes to block 1930 where this target utilization value may be provided to the HWP controller. As described herein, the HWP controller may use this target utilization value in determining an appropriate target operating frequency with low latency and greater user responsiveness.

Figure 20:
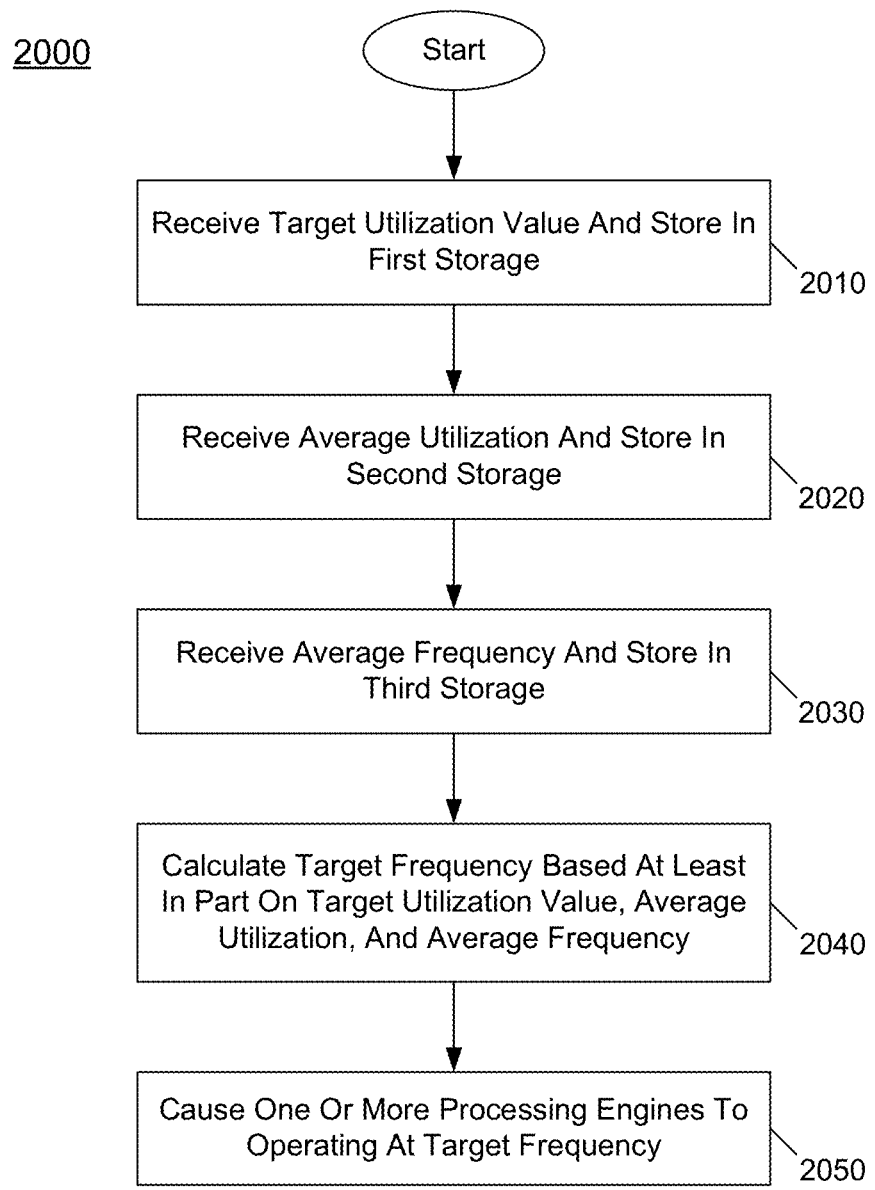
FIG. 20 is a flow diagram of a method in accordance with still another embodiment of the present invention.

Referring now to FIG. 20, shown is a flow diagram of a method in accordance with still another embodiment of the present invention. As shown in FIG. 20, method 2000 is a method for dynamically determining a target operating frequency during HWP operation in accordance with an embodiment. As such, method 2000 may be performed by hardware circuitry, software, firmware and/or combinations thereof, e.g., an HWP controller, which itself may be implemented in a power controller of a processor.

As illustrated, method 2000 begins by receiving a target utilization value (block 2010). This target utilization value, which may be derived as discussed above in FIG. 19, may be stored in a first storage, such as a register of the HWP controller. Next, control passes to block 2020 where an average utilization value may be received and stored in a second storage, e.g., another register of the HWP controller. Next, at block 2030 an average frequency value may be received and stored in a third storage, e.g., yet another register of the HWP controller. Understand that in another embodiment, a single register may include multiple fields to store the target utilization value, and the average utilization and frequency values. And of course while shown in this serial manner in FIG. 20, these values may be received in the HWP controller asynchronously, in different order or so forth.

Still referring to FIG. 20, next at block 2040 the HWP controller may calculate a target operating frequency. In embodiments herein, this target operating frequency may be calculated based at least in part on the target utilization value, average utilization value and average frequency value, such as in accordance with Equation 1, below.

$$F_{target} = U_{avg} F_{avg} \frac{1 - U_{target}}{U_{target}} \frac{1}{1 - U_{avg}} \qquad [\text{EQ. 1}]$$

In EQ. 1, $U_{target}$ is the utilization target, which depends only on the EPP value; $U_{avg}$ is the average utilization over a time window; $F_{avg}$ is the average frequency over a time window; and $F_{target}$ is the calculated target frequency.

Still with reference to FIG. 20, control passes to block 2050 where one or more processing engines may be caused to operate at this target operating frequency. To this end, the HWP controller, itself or via additional power controller circuitry, may cause one or more clock generators to generate clock signals (at this target operating frequency) for cores or other processing engines. As such, a very low latency and responsive update to a performance state can occur based on an update to an EPP value. In some cases, the HWP controller may, in a single update iteration, cause a target operating frequency (and thus resulting performance state) to be adjusted from a first performance state to a second performance state, without any intermediate steps. In this way, user experience may be enhanced, as the HWP operation to update performance state may occur nearly instantaneously, rather than via multiple intermediate updates to target operating frequency (and thus multiple intermediate performance states, e.g., each a given multiple step of the same value (e.g., an increase of four bin values per step)). Understand while shown at this high level in the embodiment of FIG. 20, many variations and alternatives are possible.

Figure 21:
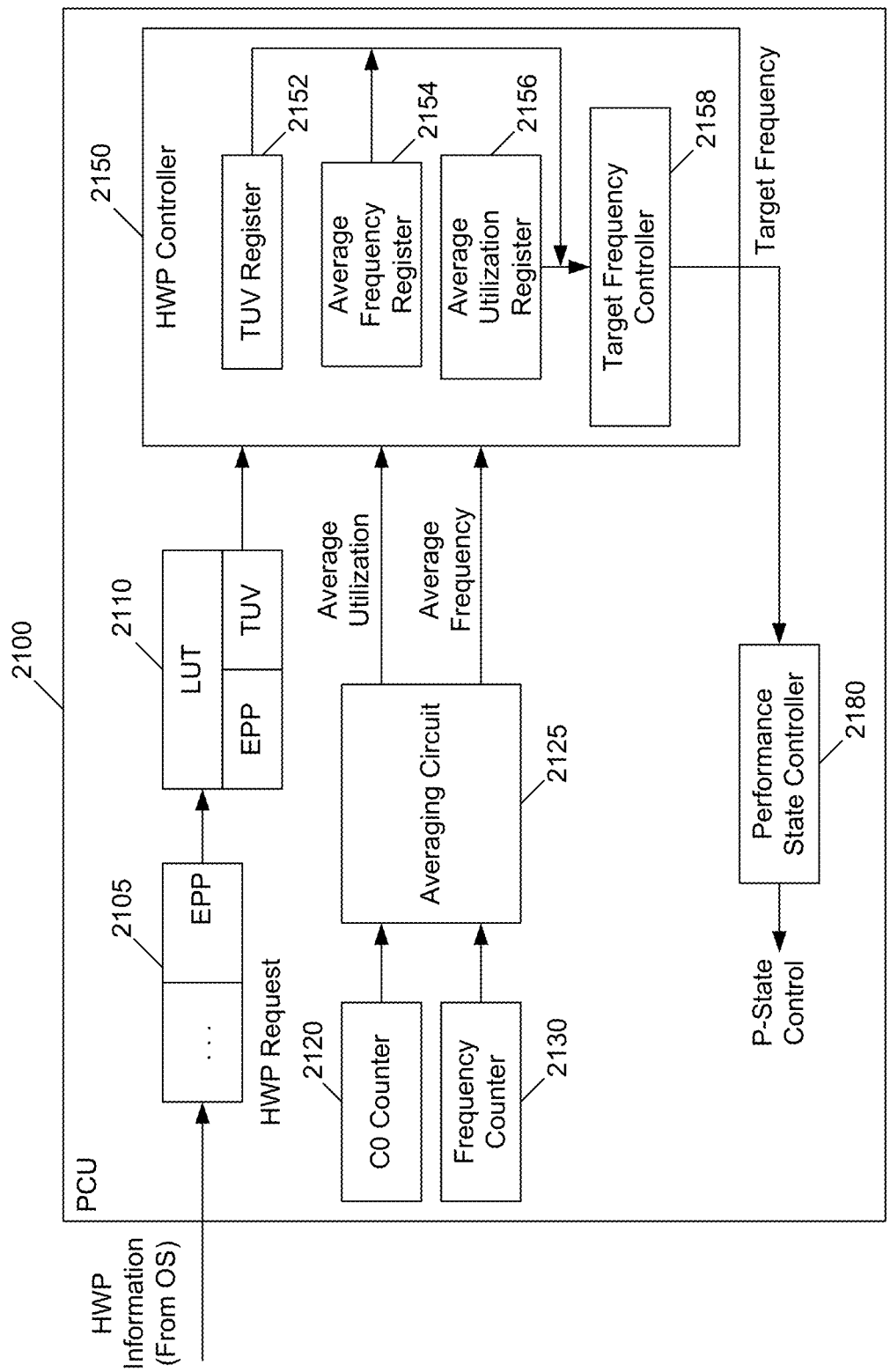
FIG. 21 is a block diagram of a power controller in accordance with an embodiment of the present invention.

Referring now to FIG. 21, shown is a block diagram of a power controller in accordance with an embodiment of the present invention. As illustrated in FIG. 21, power controller 2100 may, in an embodiment, be implemented as a power control unit (PCU) incorporated, e.g., into a multicore processor or other SoC. In the high level view shown in FIG. 21, PCU 2100 includes an HWP controller 2150 and a performance state controller 2180. Although only these two constituent controllers are shown for purposes of discussion of the HWP control described herein, understand that additional control circuitry, such as power budget controllers, thermal or other constraint controllers or so forth, also may be present within PCU 2100.

In relevant part herein, PCU 2100 receives HWP information, e.g., from an OS. As illustrated, this HWP information is stored in an HWP request register 2105. For purposes of discussion herein, assume that this HWP information includes an EPP value, which may be stored in a corresponding EPP field of HWP request register 2105. In turn, this EPP value is used to access a lookup table 2110. In embodiments, lookup table 2110 may include multiple entries each associating an EPP value (or range) with a target utilization value. In the illustrated embodiment, a target utilization value of a given entry may be accessed with the received EPP value and provided to HWP controller 2150, where it is stored in a target utilization value register 2152. Note that lookup table 2110 in different embodiments may be stored in a non-volatile memory, or it can be stored in a volatile memory that is written with the entry values during boot operations (such as may be obtained from firmware) or calculated based on some formula.

As further illustrated in FIG. 21, PCU 2100 further includes a C0 counter 2120. In embodiment, this counter may maintain a count of residency in an active C0 state of a given processing core, processing element and/or overall processor. At a given interval, this counter value may be provided to an averaging circuit 2125. As further illustrated PCU 2100 also includes a frequency counter 2130. In embodiment, this counter may maintain count information associated with an operating frequency of a given processing core, processing element and/or overall processor. At a given interval, this counter value may be provided to averaging circuit 2125. Averaging circuit 2125, at a conclusion of a given averaging window, may calculate an average frequency and an average utilization and provide these values to HWP controller 2150, where they may be stored in, respectively, an average frequency register 2154 and an average utilization register 2156. Understand while these three registers 2152-2156 are shown for illustrative purposes, more or fewer such registers or other temporary storages may be present in other embodiments.

Still with reference to FIG. 21, HWP controller 2150 further includes a target frequency controller 2158, which may receive the values from these three registers. Based at least in part on this information, target frequency controller 2158 may calculate a target frequency at which one or more cores or other processing elements of the processor may operate. In turn, target frequency controller 2158 may provide this target frequency to performance state controller 2180. Performance state controller 2180 in turn may determine a performance state (namely a voltage/frequency pair) for this target frequency and generate control signals to cause such cores or other processing elements to operate at the given performance state. Note that in some instances, depending upon the target operating frequency, performance state controller 2180 also may identify an update to an operating voltage. To this end, understand that the performance state control information may further include target operating voltage control information, which may be provided to one or more voltage regulators (e.g., one or more integrated voltage regulators and/or external voltage regulator). Understand while shown at this high level in the embodiment of FIG. 21, many variations and alternatives are possible.

Figure 22:
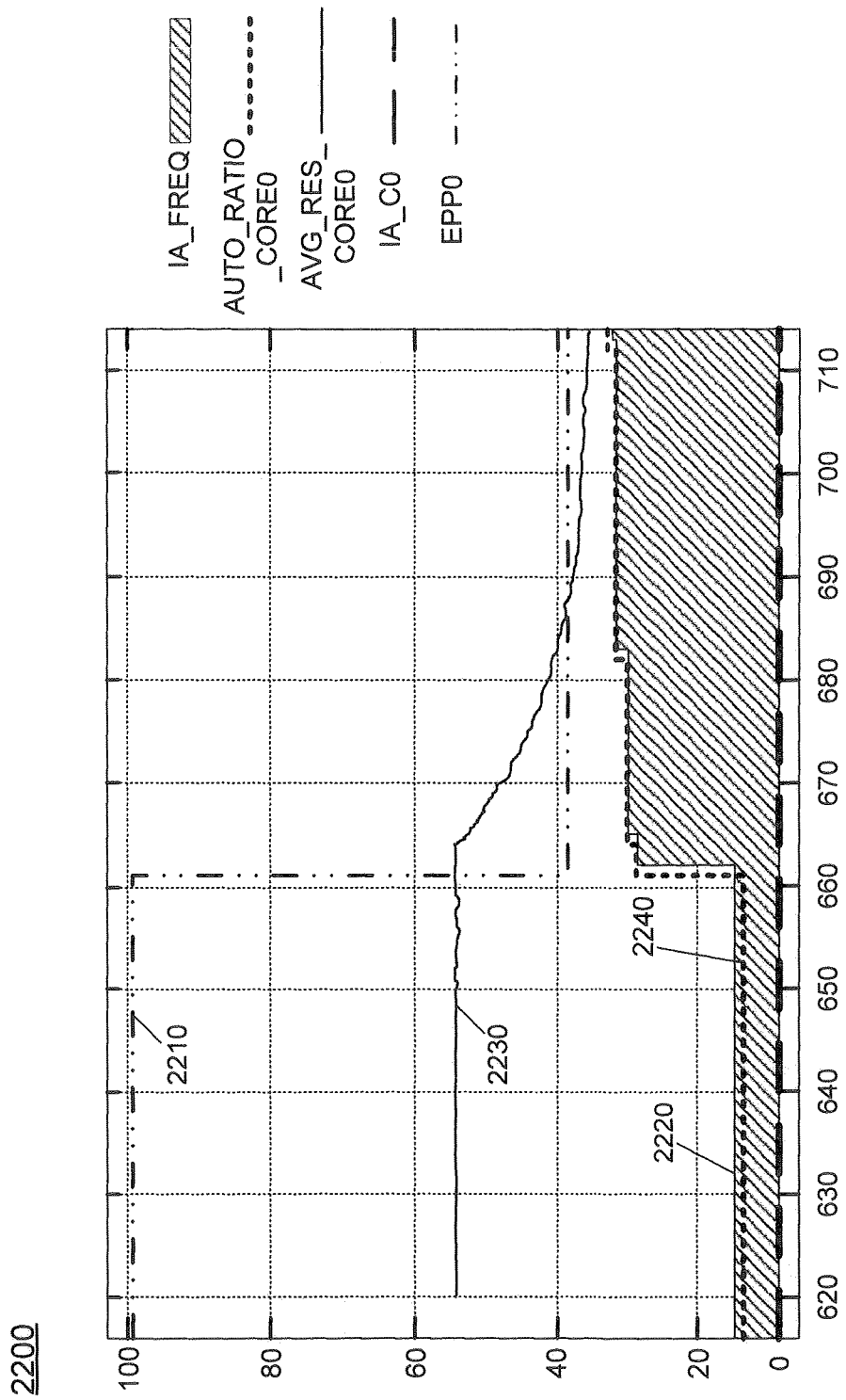
FIG. 22 is a graphical illustration of improved user responsiveness of hardware performance state control in accordance with an embodiment.

Referring now to FIG. 22, shown is a graphical illustration of improved user responsiveness of hardware performance state control in accordance with an embodiment. Illustration 2200 shows various parameters that are used in determining a target operating frequency and resulting performance state. At curve 2210, an EPP hint value starts at a high value (e.g., a maximum value, which corresponds to a high preference for energy efficiency over performance). As seen, during operation a change of the EPP hint is received in which the EPP hint value is reduced, indicating a greater desire for performance at the expense of higher power consumption. Note that this EPP hint may be provided on a per logical processor (physical core or a software thread on simultaneous multithreaded (SMT) core) basis and used to control performance state on a per core basis.

As a result of this EPP change, a substantially instantaneous change (increase) in target operating frequency also occurs, as indicated at curve 2240. Note further that this target operating frequency change is further based on average values for operating frequency and utilization, shown at curves 2220 and 2230. With an embodiment herein in which target operating frequency is based at least in part on the instantaneous EPP hint value, the target operating frequency may change rather dramatically in a single step. In contrast, typical hardware performance state updates may be limited to one or a few bin values of frequency (e.g., where each bin value is 100 megahertz). Instead, with an embodiment herein a nearly instantaneous single iteration of a hardware performance state update may cause a target operating frequency change that can be between approximately 1000 and 5000 megahertz as an example; of course other target operating frequency changes can occur in different implementations.

The following examples pertain to further embodiments.

In one example, a processor includes: a first core to execute instructions; and a power controller to control power consumption of the processor. The power controller may include a hardware performance state controller to control a performance state of the first core autonomously to an operating system, where the hardware performance state controller is to calculate a target operating frequency for the performance state of the first core based at least in part on an energy performance preference hint received from the operating system.

In an example, in response to a first update to the energy performance preference hint, the hardware performance state controller is to update the performance state of the first core from a first performance state to a second performance state in a single iteration.

In an example, the hardware performance state controller is to calculate the target operating frequency further based on an average operating frequency of the first core and an average utilization value of the first core.

In an example, the hardware performance state controller is to access a table using the energy performance preference hint to determine a target utilization value.

In an example, the hardware performance state controller is to calculate the target operating frequency further based on the target utilization value.

In an example, the hardware performance state controller is to determine the target operating frequency according to:

$$F_{target} = U_{avg} F_{avg} \frac{1 - U_{target}}{U_{target}} \frac{1}{1 - U_{avg}},$$

where $U_{target}$ is the target utilization value, $U_{avg}$ is the average utilization value, $F_{avg}$ is the average operating frequency and $F_{target}$ is the target operating frequency.

In an example, the power controller comprises: a first storage to store the target utilization value; a second storage to store the average operating frequency; and a third storage to store the average utilization value.

In an example, the power controller further comprises a performance state controller to cause at least one clock circuit to operate at the target operating frequency and to cause at least one voltage regulator to operate at an operating voltage for the performance state.

In another example, a method comprises: receiving, in a controller of a processor, an energy performance preference hint from an operating system; determining a target utilization value using the energy performance preference hint; calculating a target operating frequency based at least in part on the target utilization value, an average utilization value and an average operating frequency; and causing at least one core of the processor to operate at a first performance state, the first performance state having the target operating frequency.

In an example, determining the target utilization value using the energy performance preference hint comprises accessing a table using the energy performance preference hint to obtain the target utilization value.

In an example, the method further comprises calculating the target operating frequency according to:

$$F_{target} = U_{avg} F_{avg} \frac{1 - U_{target}}{U_{target}} \frac{1}{1 - U_{avg}},$$

where $U_{target}$ is the target utilization value, $U_{avg}$ is the average utilization value, $F_{avg}$ is the average operating frequency and $F_{target}$ is the target operating frequency.

In an example, the method further comprises causing the at least one core to change from a second performance state to the first performance state in a single update in response to calculating the target operating frequency.

In an example, the method further comprises: receiving the average utilization value and storing the average utilization value in a first storage; and receiving the average operating frequency and storing the average operating frequency in a second storage.

In an example, the method further comprises: calculating the average utilization value based on a first count value according to a weighted moving average, the first count value associated with active state residency of at least a portion of the processor; and calculating the average operating frequency based on a second count value according to a weighted moving average, the second count value associated with an operating frequency of at least the portion of the processor.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system includes a processor comprising: a plurality of cores to execute instructions; a first control circuit to receive a preference hint from an operating system and calculate a target operating frequency for at least a first core of the plurality of cores based at least in part on the preference hint and autonomously to the operating system; and a second control circuit to receive an indication of the target operating frequency from the first control circuit and in response to the indication, cause a first clock circuit associated with the first core to operate at the target operating frequency, where the second control circuit is to independently control a performance state of at least some of the plurality of cores. The system may further include a dynamic random access memory coupled to the processor, where the dynamic random access memory is to store at least a portion of the operating system.

In an example, the first control circuit is to calculate the target operating frequency further based on an average operating frequency of the first core and an average utilization value of the first core.

In an example, the first control circuit is to calculate the target operating frequency further based on a target utilization value of the first core.

In an example, the system further comprises a storage to store a table having a plurality of entries, each of the plurality of entries to associate a preference hint with a target utilization value.

In an example, the first control circuit is to use the preference hint to access a first target utilization value stored in a first entry of the plurality of entries.

In an example, the system further comprises a power controller, where the power controller is to determine at least one of the average operating frequency and the average utilization value at a periodic interval, the periodic interval based at least in part on the preference hint.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a first core to execute instructions; and
a power controller to control power consumption of the processor, the power controller including a hardware performance state controller to control a performance state of the first core autonomously to an operating system, wherein the hardware performance state controller is to calculate a target operating frequency for the performance state of the first core based at least in part on an energy performance preference hint received from the operating system, an average operating frequency of the first core, and an average utilization value of the first core.

2. The processor of claim 1, wherein, in response to a first update to the energy performance preference hint, the hardware performance state controller is to update the performance state of the first core from a first performance state to a second performance state in a single iteration.

3. The processor of claim 1, wherein the hardware performance state controller is to access a table using the energy performance preference hint to determine a target utilization value.

4. The processor of claim 3, wherein the hardware performance state controller is to calculate the target operating frequency further based on the target utilization value.

5. The processor of claim 4, wherein the hardware performance state controller is to determine the target operating frequency according to:

$$F_{target} = U_{avg} F_{avg} \frac{1 - U_{target}}{U_{target}} \frac{1}{1 - U_{avg}},$$

wherein $U_{target}$ is the target utilization value, $U_{avg}$ is the average utilization value, $F_{avg}$ is the average operating frequency and $F_{target}$ is the target operating frequency.

6. The processor of claim 4, wherein the power controller comprises:
a first storage to store the target utilization value;
a second storage to store the average operating frequency; and
a third storage to store the average utilization value.

7. The processor of claim 1, wherein the power controller further comprises a performance state controller to cause at least one clock circuit to operate at the target operating frequency and to cause at least one voltage regulator to operate at an operating voltage for the performance state.

8. A system comprising:
a processor comprising:
a plurality of cores to execute instructions;
a first control circuit to receive a preference hint generated from an operating system and calculate a target operating frequency for at least a first core of the plurality of cores based at least in part on the preference hint; and
a second control circuit to receive an indication of the target operating frequency from the first control circuit and in response to the indication, cause a first clock circuit associated with the first core to operate at the target operating frequency, wherein the second control circuit is to independently control a performance state of at least some of the plurality of cores; and
a dynamic random access memory coupled to the processor, wherein the dynamic random access memory is to store at least a portion of the operating system.

9. The system of claim 8, wherein the first control circuit is to calculate the target operating frequency further based on an average operating frequency of the first core and an average utilization value of the first core.

10. The system of claim 8, wherein the first control circuit is to calculate the target operating frequency further based on a target utilization value of the first core.

11. The system of claim 8, further comprising a storage to store a table having a plurality of entries, each of the plurality of entries to associate a preference hint with a target utilization value.

12. The system of claim 11, wherein the first control circuit is to use the preference hint to access a first target utilization value stored in a first entry of the plurality of entries.

13. The system of claim 9, further comprising a power controller, wherein the power controller is to determine at least one of the average operating frequency and the average utilization value at a periodic interval, the periodic interval based at least in part on the preference hint.

14. A processor comprising:
a first core to execute instructions; and
a hardware performance state controller to control a performance state of the first core, wherein the hardware performance state controller is to calculate a target operating frequency for the performance state of the first core based at least in part on a hint received and generated from an operating system, the hint having a value to indicate a relative preference between performance and energy conservation.

15. The processor of claim 14, wherein, in response to a first update to the value of the hint, the hardware performance state controller is to update the performance state of the first core from a first performance state to a second performance state in a single iteration.

16. The processor of claim 14, wherein the hardware performance state controller is to access a table using the value of the hint to determine a target utilization value.

17. The processor of claim 16, wherein the hardware performance state controller is to calculate the target operating frequency further based on the target utilization value.

18. The processor of claim 17, wherein the hardware performance state controller is to determine the target operating frequency according to:

$$F_{target} = U_{avg} F_{avg} \frac{1 - U_{target}}{U_{target}} \frac{1}{1 - U_{avg}},$$

wherein $U_{target}$ is the target utilization value, $U_{avg}$ is an average utilization value, $F_{avg}$ is an average operating frequency and $F_{target}$ is the target operating frequency.

* * * * *